(12) United States Patent
Elezabi

(10) Patent No.: US 8,094,699 B2
(45) Date of Patent: Jan. 10, 2012

(54) METHODS AND SYSTEMS FOR DEMODULATING A MULTIUSER SIGNAL USING CHANNEL DECODERS FOR A MULTIPLE-ACCESS COMMUNICATION SYSTEM

(75) Inventor: Ayman Yehia Elezabi, Cairo (EG)

(73) Assignee: American University in Cairo, Cairo (EG)

( * ) Notice: Subject to any disclaimer, the term of this patent is extended or adjusted under 35 U.S.C. 154(b) by 886 days.

(21) Appl. No.: 11/901,259

(22) Filed: Sep. 14, 2007

(65) Prior Publication Data
US 2008/0069185 A1  Mar. 20, 2008

Related U.S. Application Data

(60) Provisional application No. 60/934,582, filed on Jun. 14, 2007, provisional application No. 60/844,537, filed on Sep. 14, 2006.

(51) Int. Cl.
*H04B 1/00* (2006.01)
(52) U.S. Cl. ............................. 375/140; 375/142
(58) Field of Classification Search .......... 375/142–145, 375/148, 150, 347, 349, 341
See application file for complete search history.

(56) References Cited

U.S. PATENT DOCUMENTS

| | | | |
|---|---|---|---|
| 5,553,062 A | 9/1996 | Schilling et al. | |
| 5,644,592 A | 7/1997 | Divsalar et al. | |
| 6,161,209 A | 12/2000 | Moher | |
| 7,035,317 B2 | 4/2006 | Elezabi et al. | |
| 7,242,675 B2 | 7/2007 | Schilling et al. | |
| 2002/0126644 A1* | 9/2002 | Turpin et al. .................. | 370/342 |
| 2003/0081701 A1* | 5/2003 | Pick et al. ...................... | 375/341 |
| 2004/0083082 A1* | 4/2004 | Onggosanusi et al. ........... | 703/2 |
| 2005/0128966 A1* | 6/2005 | Yee ................................ | 370/310 |
| 2005/0195889 A1* | 9/2005 | Grant et al. .................... | 375/148 |
| 2006/0193374 A1* | 8/2006 | Guo et al. ...................... | 375/148 |

OTHER PUBLICATIONS

"Code division multiple access," Wikipedia, http://en.wikipedia.org/wiki/Cdma, pp. 1-8 (Downloaded from the Internet on Sep. 4, 2007).
Elezabi, "Improved Turbo Decoding and Interference Cancellation for DS-CDMA with Random Spreading," IEEE Vehicular Technology Conference, pp. 1-5 (Sep. 2006).
Notice of Allowance and Fee(s) Due for U.S. Appl. No. 09/957,339 (Sep. 6, 2005).
Non-Final Official Action for U.S. Appl. No. 09/957,339 (Feb. 8, 2005).

(Continued)

*Primary Examiner* — Emmanuel Bayard
(74) *Attorney, Agent, or Firm* — Jenkins, Wilson, Taylor & Hunt, P.A.

(57) ABSTRACT

Methods and systems for demodulating a multiuser signal using channel decoders for a multiple-access communication system are disclosed. According to one method, a signal containing information for a plurality of users in a multiple-access communication system employing spreading sequences is received. The received signal is despread using a signature sequence for each user to produce individual user signals having multiple-access interference (MAI). Channel estimates associated with each of the individual user received signals are determined. Each of the individual user signals are decoded using a channel decoder with a log-likelihood ratio (LLR) that accounts for the time-varying variance of the MAI in the individual user signals based on a model of the MAI including the channel estimates of the received signals of other users.

25 Claims, 17 Drawing Sheets

OTHER PUBLICATIONS

Hsieh et al., "Optimal Two-Stage Decoupled Partial PIC Receivers for Multiuser Detection", IEEE Transactions on Wireless Communications, vol. 4,. No. 1, pp. 112-127 (Jan. 2005).

Morosi et al, "Design of Turbo-MUD Receivers with Density Evolution in Overloaded CDMA Systems," IEEE WCNC, pp. 1-5 (2005).

Elezabi et al., "Improved Viterbi Decoder Metrics for Two-Stage Detectors in DS-CDMA," IEEE Transactions on Wireless Communications, vol. 3, No. 5, pp. 1399-1404 (Sep. 2004).

Morosi et al, "Improved Iterative Parallel Interference Cancellation Receiver for DS-CDMA 3G Systems" IEEE WCNC, pp. 877-882 (Mar. 2003).

Li et al., "Turbo Multiuser Detection for Turbo-Coded CDMA in Multipath Fading Channels," IEEE Transactions on Vehicular Technology, vol. 51, No. 5, pp. 1096-1108 (Sep. 2002).

"3rd Generation Partnership Project; Technical Specification Group Radio Access Network; Multiplexing and channel coding (TDD) (Release 1999)," 3GPP TS 25.222, V3.10.0, pp. 1-40 (Sep. 2002).

"3rd Generation Partnership Project; Technical Specification Group Radio Access Network; Multiplexing and channel coding (FDD) (Release 1999)," 3GPP TS 25.212, V3.10.0, pp. 1-63 (Jun. 2002).

Yu, "Practical Iterative Multiuser Detection for Turbo Encoded Signals in Cdma Systems", IEEE Globecom, pp. 931-935 (2002).

Nordio et al., "Design and Performance of a Low-Complexity Iterative Multiuser Joint Decoder Based on Viterbi Decoding and Parallel Interference Cancellation," IEEE International Conference on Communications, pp. 1-5 (2002).

Wu et al., "An Iterative Multiuser Receiver Using Partial Parallel Interference Cancellation for Turbo-Coded DS-CDMA Systems," IEEE Globecom, pp. 244-248 (Nov. 2001).

Hsu et al., "A Low-Complexity Iterative Multiuser Receiver for Turbo-Coded DS-CDMA Systems," IEEE Journal on Selected Areas in Communications, vol. 19, No. 9, pp. 1775-1783 (Sep. 2001).

"3rd Generation Partnership Project; Technical Specification Group Radio Access Network; Physical channels and mapping of transport channels onto physical channels (TDD) (Release 4)," 3GPP TS 25.221, V4.2.0 (Sep. 2001).

Wu et al, "Soft-Input Soft-Output Partial Parallel Interference Cancellation for DS-CDMA Systems", IEEE ICC, pp. 1-5 (2001).

Kim et al., "Performance of Iterative Multiuser Detection with a Partial PIC Detector and Serially Concatenated Codes", Vehicular Technology Conference, pp. 487-491 (2001).

Elezabi et al., "Improved Single-User Decoder Metrics for Two-Stage Detectors in DS-CDMA," IEEE Vehicular Technology Conference, pp. 1276-1281 (Sep. 2000).

Juntti et al., "Multiuser Receivers for CDMA Systems in Rayleigh Fading Channels", IEEE Transactions on Vehicular Technology, vol. 49,. No. 3, pp. 885-899 (May 2000).

Wang et al., "Iterative (Turbo) Soft Interference Cancellation and Decoding for coded CDMA," IEEE Transactions on Communications, vol. 47, No. 7, pp. 1046-1061 (Jul. 1999).

Shurk et al., "Integrated Interference Cancellation and Decoding for CDMA Systems using Turbo Code", Proceedings of WCNC, vol. 3, pp. 1-5 (1999).

Elezabi et al., "Two-Stage Receiver Structures for Coded CDMA Systems," IEEE Vehicular Technology Conference, pp. 1425-1429 (1999).

Elezabi et al., "Post-Decoding Interference Cancelation for Coded CDMA Systems," Proceedings of IEEE International Conference on Information Theory, p. 282 (1998).

Divsalar et al., "Improved Parallel Interference Cancellation for CDMA," IEEE Transactions on Communications, vol. 46, No. 2, pp. 258-268, Feb. (1998).

Zeng et al., "Modified Viterbi Detection for Recording Channels with Jitter," Proceedings of IEEE International Communications Conference, pp. 305.5.1-305.5.5 (1992).

Varanasi et al., "Multistage Detection in Asynchronous Code-Division Multiple-Access Communications," IEEE Transactions on Communications, vol. 38, No. 4, pp. 509-519 (Apr. 1990).

Pursley, "Performance Evaluation for Phase-Coded Spread-Spectrum Multiple-Access Communication-Part I: System Analysis," IEEE Transactions on Communications, pp. 795-799 (Aug. 1977).

Serfling, "Contributions to Central Limit Theory for Dependent Variables," The Annals of Mathematical Statistics, vol. 39, No. 4, pp. 1158-1175 (1968).

\* cited by examiner

METHODS AND SYSTEMS FOR DEMODULATING A MULTIUSER SIGNAL USING CHANNEL DECODERS FOR A MULTIPLE-ACCESS COMMUNICATION SYSTEM

RELATED APPLICATIONS

The presently disclosed subject matter claims the benefit of U.S. Provisional Patent Application Ser. No. 60/934,582, filed Jun. 14, 2007, and U.S. Provisional Patent Application Ser. No. 60/844,537, filed Sep. 14, 2006; the disclosures of which are incorporated herein by reference in their entireties.

TECHNICAL FIELD

The subject matter disclosed herein relates to decoders for use in multiple-access communication systems. In particular, the subject matter disclosed herein relates to methods and systems for demodulating a multiuser signal using channel decoders for a multiple-access communication system.

BACKGROUND

Virtually all multiple-access communication systems today employ some form of forward error correction. A multiple-access communication system is a system in which multiple users can simultaneously communicate over the same channel. A code division multiple access (CDMA) system is a multiuser system in which signals of different users are spread over a wide frequency band using different spreading codes. The despreader in such a system uses the spreading code of each individual user to despread that user's signal and obtain the originally transmitted data. A decoder, such as a Viterbi or Turbo decoder, may be used to correct bit errors in the received signal for each user in systems which employ convolutional encoders at the transmitter.

The capacity of CDMA systems in mobile environments is mainly limited by multiple-access interference (MAI) and fading. Multi-user detectors and error-control coding are two primary means to improve performance of CDMA in wireless systems. While the channel coding is specified in any communication standard, multi-user detection is a differentiating receiver feature for manufacturers. Recently, parallel interference cancellation (PIC) has received much interest for base station receivers as it is more suited to the uplink due to its asynchronous nature which, together with long spreading codes, makes interference suppression using other multi-user detectors difficult. Moreover, PIC is well-suited for iterative demodulation and decoding. In such an arrangement, single-user Viterbi or Turbo detectors are typically used for each user.

In dealing with PIC and decoding, the residual MAI (RMAI) has predominantly been modeled as Gaussian. However, the structured RMAI after PIC has statistics that are quite different from Gaussian. This casual application of the so-called Gaussian assumption has resulted in branch or transition metrics for the Viterbi decoder and log-likelihood ratios (LLRs) for the Turbo decoder that offer weaker coding gains than possible. Accordingly, there exists a long-felt need for improved methods and systems for demodulating a multiuser signal using channel decoders for a multiple-access communication system.

SUMMARY

In accordance with this disclosure, novel methods and systems for demodulating a multiuser signal using channel decoders for a multiple-access communication system are provided.

It is an object of the present disclosure therefore to provide novel methods and systems for demodulating a multiuser signal using channel decoders for a multiple-access communication system. This and other objects as may become apparent from the present disclosure are achieved, at least in whole or in part, by the subject matter described herein.

BRIEF DESCRIPTION OF THE DRAWINGS

Preferred embodiments of the subject matter described herein will now be explained with reference to the accompanying drawings of which.

DETAILED DESCRIPTION

Improved systems and methods for demodulating a multiuser signal using channel decoders for a multiple-access communication system are disclosed herein. In particular, improved log-likelihood ratios (LLRs), also known as branch or transition metrics, are disclosed for full and partial parallel interference cancellation (FPIC and PPIC) detectors including iterative multistage structures for convolutionally- and Turbo-encoded direct-sequence CDMA (DS-CDMA) systems. The partial cancellation factors are derived based on the log-likelihood ratios (LLRs) of each user's bit. The LLR is obtained based on an enhanced estimate of the variance of the multiple-access interference (MAI) and residual MAI (RMAI) plus noise. Towards that goal, the RMAI terms are modeled as conditionally Gaussian with a time-dependent variance that is a function of the user cross-correlations and channel estimates, such as fading coefficients. The partial cancellation factors (PCFs) used in the PPIC are consequently improved.

A heuristic estimate is obtained for the RMAI plus noise variance in PPIC detectors. Significant gains due to the improved LLRs are realized over previous FPIC and PPIC in frequency non-selective Rayleigh fading channels. Reduced complexity forms of the variance estimates and LLRs are proposed and also shown to provide a performance advantage. The improved LLRs are also found to provide significant performance gains when applied after a conventional first stage without PIC. Various channel models may be applied in accordance with the subject matter disclosed herein, including Rician and Nakagami fading channel models, in which case the expressions for the estimates of the MAI and RMAI plus noise variance can be modified appropriately.

Figure 1:
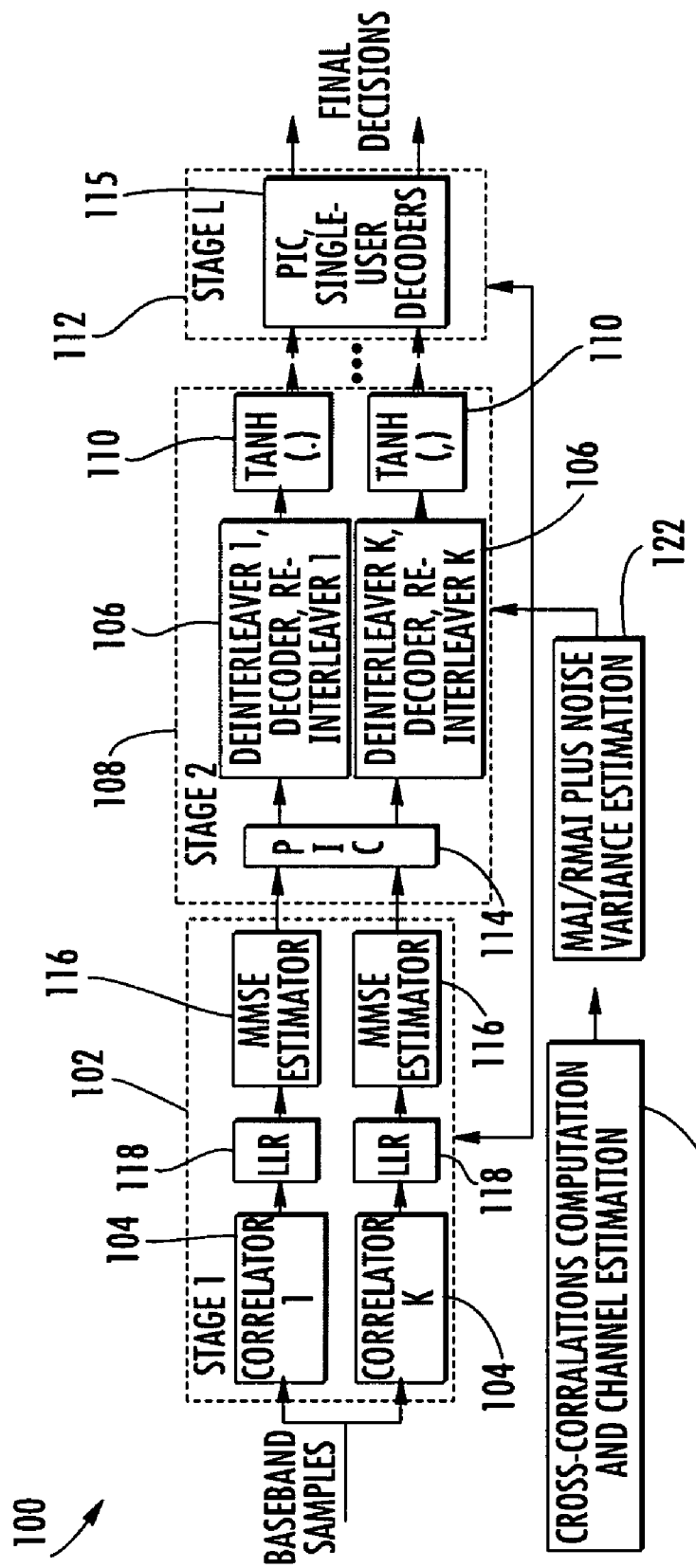
FIG. 1 is a block diagram of a partial parallel interference cancellation detector or receiver according to an embodiment of the subject matter disclosed herein.

Multiple-Access Communication System Model and Receiver Structures According to a First Aspect In a multiple-access communication system to which embodiments of a first aspect of the subject matter disclosed herein may be applied, K users may transmit bit-synchronously using binary CDMA signaling over a Rayleigh fading frequency-nonselective channel with additive white Gaussian noise (AWGN). At the receiver, a bank of K matched filter correlators or despreaders despreads each user's signal. Nonlinear estimators may produce first stage estimates of each user's bit. The estimates are used in the following stage for PIC and the result supplied to single-user decoders. For one-shot PIC (two-stage) detectors, the decoder outputs are the final decisions. For multi-stage PIC, the single-user decoders produce soft outputs that are re-interleaved and another nonlinear estimator provides the following stage with refined estimates of the user bits for another stage of PIC. This process is repeated until the final stage produces hard decisions on the bit of each user. FIG. 1 is a conceptual block diagram of an exemplary PPIC detector or receiver, generally designated 100, according to an embodiment of the subject matter disclosed herein. Referring to FIG. 1, receiver 100 comprises L stages including a first stage 102 which is a matched filter bank. More detail is provided below of the components of receiver 100 and of the improved LLRs for single-user receivers without IC.

Sampling at any bit interval, the output of the $m^{th}$ stage after coherent phase compensation for user 1, a user of interest, is given by:

$$y_1(m) = |c_1|b_1 + \sum_{j=2}^{K} r_{1j}|c_j|\cos(\theta_j - \theta_1)[b_j - \alpha_j(m-1)] + n_1 = \quad (1)$$

$$|c_1|b_1 + \sum_{j=2}^{K} r_{1j}X_{j1}e_j(m) + n_1$$

where $c_j=|c_j|\exp(i\theta_j)$ is the complex Gaussian fading coefficient for user j, $b_j$ is the bit of user j ($b_j=\pm 1$), $r_{1j}$ is the normalized cross-correlation between user 1 and user j, $n_1$ is the thermal noise term of user 1 having variance $\sigma^2$, $\alpha_j(m-1)$ is the estimate of user j from stage m−1 and is used as a partial cancellation factor in stage m. In the second equality, $X_{j1}=|c_j|\cos(\theta_j-\theta_1)$ is the real fading coefficient due to the MAI from user j that is experienced by user 1, and $e_j(m)=[b_j-\alpha_j(m-1)]$ is the cancellation error term of user j in stage m. For a FPIC with hard decisions, $\alpha_j(m-1)$ is the tentative hard decision ($=\pm 1$) on $b_j$ from stage m−1. For m=1, i.e. at the output of first stage 102 prior to any cancellation, $\alpha_j(0)=0$. Frequency nonselective Rayleigh fading is assumed where the complex fading coefficients are fixed for the duration of the code bit and are independent from bit to bit. In following sections, various cancellation and decoding techniques based on equation (1) above are described.

Full PIC for the First Aspect

In many CDMA systems, long spreading sequences are used that result in cross-correlations that appear random from bit to bit. In accordance with the subject matter disclosed herein the LLR may be obtained after PIC. LLR is also referred to herein as a branch metric or a transition metric. Resulting RMAI terms may include the product of the time-varying cross-correlations and the approximately Gaussian interference from other users. Thus, techniques described herein may condition on the known cross-correlations and model the RMAI as conditionally Gaussian. Accordingly, the techniques described herein may achieve better results than conventional approaches, where the standard Gaussian approximation (SGA) is applied to model the RMAI terms, for two reasons. Firstly, the distribution of the RMAI is not very close to Gaussian. Secondly, the conventional approach ignores knowledge of the cross correlations which the decoder may benefit from since the cross-correlations appear as a time-varying multiplicative factor in the RMAI terms. Referring to equation (1) above and considering the signal of user 1, once the randomness of the cross-correlations $\{r_j\}$ is removed by conditioning the remaining term is quite close to Gaussian since $X_{j1}=|c_j|\cos(\theta_j-\theta_1)$ is exactly Gaussian and in the case of FPIC $e_j \in \{-2,0,2\}$. Thus, conditioning on $\{r_{1j}\}$, the total RMAI plus noise may be well modeled as a Gaussian random variable with time-dependent variance. A further improvement may be obtained by using knowledge of the channel, i.e. fading coefficients, of other users in which case the single-user decoders would be utilizing all the available information about the interfering users. In the last case, the central-limit theorem may be utilized to model the total RMAI plus noise as Gaussian. Hence, in all cases, the LLR for the Turbo decoder of user j in the second stage may be written in the form $$L_j(2) = \frac{2y_j(2)|c_j|}{\psi_j(2)} \quad (2)$$

where $\psi_j(2)$ is the total RMAI plus noise variance in the signal of user j at the second stage, i.e. after one stage of PIC. Next, the conditional variance of the total RMAI plus noise may be computed for the different cases. Throughout this section, the designation of stage number in the error terms $\psi_j(2)$ is dropped for convenience.

Improved LLR with Cross-Correlation and Channel (ILLR-XC) Information for Full PIC By symmetry arguments, the RMAI terms have zero mean and conditioning on all users' fading and cross-correlation coefficients. The conditional variance and the RMAI plus noise in the signal user 1 after one stage of PIC as $$\Psi_1(2) \cong \sum_{j=2}^{K} r_{1j}^2 X_{j1}^2 E[e_j^2 \mid U_j] + \sigma^2 \quad (3)$$

where $E[x|y]$ is the expectation of x conditioned on y and $U_j = \{X_{kj}, r_{jk}: k=1, \ldots, K\}$ is the set of cross-correlations and phase compensated fading coefficients affecting the decision on $b_j$. The above expression involves an approximation in that we ignored the dependence between the RMAI and noise terms when summing their variances. Note that $X_{jj} = |c_j|$ and in the synchronous case $r_{jk} = r_{kj}$. $E[e_j^2|U_j]$ is obtained as follows:

$$E[e_j^2 \mid U_j] = \quad (4)$$

$$\sum_{e_j \in \{-2,0,2\}} e_j^2 P[e_j^2 P[e_j \mid U_j] = 4P[e_j = 2 \mid U_j] + 4P[e_j = -2 \mid U_j] =$$

$$8P[\hat{b}_j = -1, \hat{b} = 1 \mid U_j] = 8P[\hat{b}_j = -1 \mid b_j = 1, U_j]P[b_j = 1] =$$

$$4P[\hat{b}_j = -1 \mid b_j = 1, U_j] = \frac{4}{2^{K-1}} \sum_{b:b_j=1} Q\left[\frac{|c_j| + \sum_{k \neq j} X_{kj} r_{kj} b_k}{\sigma}\right]$$

where $\bar{b}$ is the vectors of all users' bits, i.e. the last summation is over all combinations of the user bits while fixing $b_j=1$. The number of terms is therefore exponential in the number of users making the computation impractical. In order to simplify the computation, the conditioning on $\{X_{kj}:k \neq j\}$ is dropped, but conditioning is still performed on $|c_j|$. In this case, the MAI plus noise appearing in the signal of user j is exactly Gaussian with variance given by $$n_j^2 = \sum_{k \neq j} r_{jk}^2 E_k + \sigma^2 \quad (5)$$

where $E_j$ is the average code bit energy for user j. Therefore, the following expression results for the conditional variance of the error term:

$$E[e_j^2 \mid \{r_{jk}, k = 1, \ldots, K\}, |c_j|] = 4Q\left(\frac{|c_j|}{n_j}\right) \quad (6)$$

In the notation used herein, the symbol $n_j^2$ indicates only the variance of the MAI plus noise experienced by user j at first stage 102 after the matched filter bank. Substituting equation (6) in equation (3), the estimate of the RMAI plus noise variance experienced by user 1 is given by $$\psi_1(2) \cong 4 \sum_{j=2}^{K} r_{1j}^2 X_{kj}^2 + \sigma^2 \quad (7)$$

In the interest of using the knowledge of $\{X_{kj}:k \neq j\}$ in computing equation (6), the Gaussian approximation (GA) may be invoked to model the MAI terms plus noise as conditionally Gaussian with variance given by $$n_j^2 = \sum_{k \neq j} r_{jk}^2 X_{kj}^2 + \sigma^2 \quad (8)$$

While the SGA is quite poor in this case and equation (6) becomes approximate the improved estimate of the MAI plus noise variance in equation (8) due to the additional information resulted in better performance. Therefore, equation (8) may be used in equation (7) to compute the total RMAI plus noise variance that is used in equation (2) to obtain the LLR which we refer to as the improved LLR with cross-correlation and channel (ILLR-XC) information.

Improved LLR with Cross-Correlation (ILLR-X) Information for Full PIC

Now, the total RMAI plus noise variance is derived using knowledge of only the user cross-correlations which is equivalent to taking the expectation over $|c_j|$ of the RMAI variance terms of equation (3). The conditional variance of the RMAI term due to user j is $r_{1j}^2 E[(|c_j| \cos(\theta_j - \theta_1)e_j)^2]$. The variance of the total RMAI plus noise seen by user 1 conditioned on the cross-correlation may be approximated by $$\psi_1(2) \cong 2 \sum_{j=2}^{K} E_j r_{1j}^2 \left\{1 - \sqrt{\frac{E_j}{E_j + n_j^2}} \left(\frac{n_j^2}{2(n_j^2 + E_j)} + 1\right)\right\} + \sigma^2 \quad (9)$$

where $n_j^2$ is the MAI plus noise variance of equation (5). It should be pointed out that because the RMAI plus noise variance of equation (9) using equation (5) will eventually be used in equation (2) for user 1 where $|c_1|$ is already computed the MAI plus noise variance of equation (5) may be rewritten with a fixed term for the fading coefficient of user 1.

Simplified Improved LLR (SILLR-X) for Full PIC

To reduce the computations involved in the time-dependent variance $\psi_1(2)$ estimation of equation (8) used in the improved ILLR-X, the MAI plus noise variance $n_j^2$ may be averaged over the user cross-correlations to obtain an unconditional MAI plus noise variance that is not time-varying. Since $E[r_{1j}^2]=1/N$ in the synchronous case, this would be given by $$n_j^2 \approx \frac{1}{N} \sum_{k \neq j} E_k + \sigma^2 \quad (10)$$

There is a slight inconsistency involved here because of earlier conditioning on $r_{1j}$ in obtaining the total RMAI plus noise variance of equation (9). However, the difference is small and is ignored in the interest of making $n_j^2$ time-independent. Furthermore, for equal received user energies $E_c$, this MAI plus noise variance is equal for all users and is given by $n^2 = \sigma^2 + ((K-1)E_c/N)$. This makes the terms inside the summation in equation (3) both time- and user-independent except for the cross-correlations and greatly simplifies the computation. The LLR obtained using this simplified form of the RMAI plus noise variance is referred to as the simplified improved LLR with cross-correlation (SILLR-X) information.

Improved LLR with Channel (ILLR-C) Information for Full PIC

Another variation on the improved LLR computation is obtained by using knowledge of the channel estimates of all users but not the cross-correlations. Besides reducing complexity in yet another way, this technique may be useful in two applications. The first is when the cross-correlations are not needed, as in conventional single-user detection receivers where no PIC is employed. The second application is when the cross-correlations are not explicitly computed because the PIC is carried out in the spread domain, i.e. after each stage the users' estimates or decisions are used for re-spreading and PIC takes place at the chip sample level. This may be advantageous in some cases, e.g. for multiple antenna systems in multi-path fading environments. The third application where the ILLR-C may be useful is for DS-CDMA systems with short spreading sequences or which allow short sequences, e.g. where this is an option to use short sequences on the uplink channel to facilitate multi-user detection by the base station. In that situation, the cross-correlations change very slowly, depending on how fast the channel delays change, and need to be updated infrequently. In all such cases, the channel information, which must still be estimated at the base station, would be used to improve the LLRs of the single-user decoders. Thus, conditioning on $V_j = \{X_{kj:k=1,\ldots,K}\}$, the RMAI plus noise variance for user 1 after PIC may be expressed as $$\psi_1(2) \approx \frac{1}{N} \sum_{j=2}^{K} X_{j1}^2 E[e_j^2 | V_j] + \sigma^2 \quad (11)$$

In obtaining $E[e_j^2 | V_j]$, the SGA may be invoked to model the MAI plus noise since each of the cross-correlation terms themselves are approximately Gaussian by the same SGA. Thus, dropping the conditioning on $\{X_{kj}, k \neq j\}$ as we did to obtain equation (6), $E[e_j^2 | V_j] = 4Q(|c_j|/n_j)$ may be substituted in equation (11) to yield $$\psi_1(2) \approx \frac{4}{N} \sum_{j=2}^{K} X_{j1}^2 Q\left(\frac{|c_j|}{n_j}\right) + \sigma^2 \quad (12)$$

where $$n_j^2 = \frac{1}{N} \sum_{k \neq j} X_{kj}^2 + \sigma^2 \quad (13)$$

LLR (LLR-SGA) for Full PIC

A technique is described in this section whereby the LLR for the single-user decoders may be obtained without utilization of knowledge of the other users' signal parameters. The enhanced variance estimate of equation (9) was obtained by taking into account the strong dependence between $|c_j|$ and $e_j$ in $E[(|c_j|e_j)^2]$ after conditioning on $r_{1j}$. If we ignore the dependence between $|c_j|$ and $e_j$, in particular, as well as the dependence between any of the factors comprising the RMAI terms in equation (1) and take the expectation over the squares of all these factors separately to arrive at the conventional estimate for the RMAI plus noise variance. This may be represented as $$\psi_1(2) = \frac{4}{N} \sum_{k \neq j} P_j E_j + \sigma^2 \quad (14)$$

where $P_j$ is the error probability of user j at the output of the conventional first stage (matched filter) and is obtained from the error probability expression for a single user on a flat fading channel and applying the Gaussian approximation to model the MAI plus noise. For equal user energies $E_c$ and equal first stage error probabilities $P_e$, the RMAI plus noise variance is given by the expression $4E_c(K-1)P_e/N$. The LLR obtained using this method is referred to as the LLR with standard Gaussian approximation (LLR-SGA).

Figure 2:
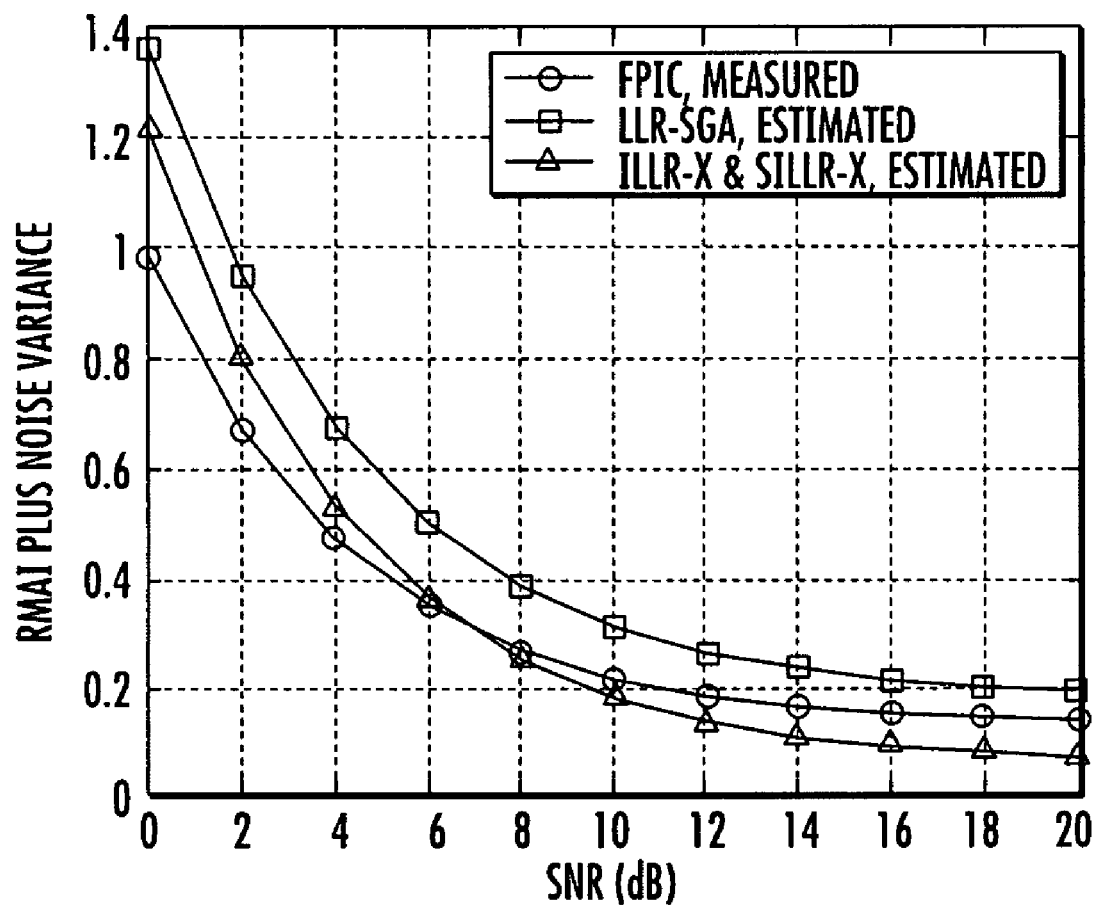
FIG. 2 is a graph showing measured and estimated RMAI plus noise variance using different 2-stage FPIC techniques according to embodiments of the subject matter disclosed herein.

FIG. 2 is a graph showing the measured and estimated RMAI plus noise variance using different 2-stage FPIC techniques. In particular, FIG. 2 shows the estimated RMAI plus noise variance using the improved technique of equation (8) and its simplified version (SILLR-X) as well as the unconditional variance estimate obtained using the conventional method of equation (10). Both are compared to the measured RMAI plus noise variance for a 4-user system with a spreading factor N=4. Clearly, both improved estimates are closer to the actual measured RMAI plus noise variance than the conventional estimate.

Partial PIC for the First Aspect

The nonlinear minimum mean square error (MMSE) estimator for $b_j$ may be derived and shown to be in the form of a hyperbolic tangent of the log-likelihood ratio for bit $b_j$ given certain information, recursively, about the previous stage estimate of the bit of user j and the other users' bit estimates. The AWGN channel may be considered and the SGA applied throughout. In this section, the above result is applied to obtain the nonlinear MMSE estimator for the bits at the output of the first stage based on a more accurate conditional Gaussian model for the MAI plus noise in Rayleigh fading channels. In particular, it is noted that MAI terms are exactly conditionally Gaussian when conditioning only on the cross-correlations. This means that using the MMSE estimates for subtractive interference cancellation in the case of two-stage detectors, i.e. one-shot PIC, should result in optimum performance within the class of subtractive interference cancellation detectors when given only for user 1, say, the cross-correlations $\{r_{1j}\}$, the single-user matched filter output $y_1(1)$, and its fading coefficient $c_1$.

The Partial Cancellation Factor (PCF) associated with a user j to be used for the cancellation of that user's MAI term in stage 2 is obtained from stage 1 and given by $\alpha_j(1)=\tan h[\alpha(1)L_j(1)]$ to yield $$\alpha_j(1) = \tanh\left[a(1)\frac{2y_j(1)|c_j|}{n_j^2}\right] \quad (15)$$

Where a(1) is a slope parameter that is to be optimized and substituting the stage number m=1 in equation (1) results in no PIC and so all MAI terms are present. We obtain several forms from the PCFs by incorporating different levels of information similar to what was done for the LLRs of the Turbo decoders in the previous section on FPIC. Specifically, we use the formulations in equations (5), (8), (10), and (13) for the MAI plus noise variance in (11). The RMAI plus noise variance estimate to be used in the LLR for the Turbo decoders must now be modified for the case of PPIC.

Improved LLR with Cross-Correlation and Channel (ILLR-XC) Information for Partial PIC Utilizing all users' fading and cross-correlation coefficients the conditional variance of RMAI plus noise in the signal of user 1 after one stage of PIC may be expressed as in equation (3). As in the case of FPIC, the conditional variance of the error term $E[e_j^2|\{X_{kj},r_{jk}\}:k=1,\ldots,K]$ consists of $2^{(K-1)}$ terms making it impractical to compute. Furthermore, each of these terms has no closed form solution or it is very difficult to obtain. We therefore drop the conditioning on other users' fading coefficients $\{X_{kj}:k\neq j\}$ but still condition on $|c_j|$, as we did in the FPIC case. However, unlike in the FPIC a closed from expression for the conditional variance is not available and the following heuristic expression may be used:

$$E[e_j^2 \mid \{r_{jk}, k = 1, \ldots, K\}, |c_j|] = \quad (16)$$
$$[1 + \alpha_j(1)]^2 P_j + [1 - \alpha_j(1)]^2(1 - P_j) = 4\alpha_j(1)Q\left(\frac{|c_j|}{n_j}\right) + [1 - \alpha_j(1)]^2$$

together with the following expression for the PCF $$\alpha_j(1) = \tanh\left[\frac{a(1)2|c_j|^2}{n_j^2}\right] \quad (17)$$

Figure 3:
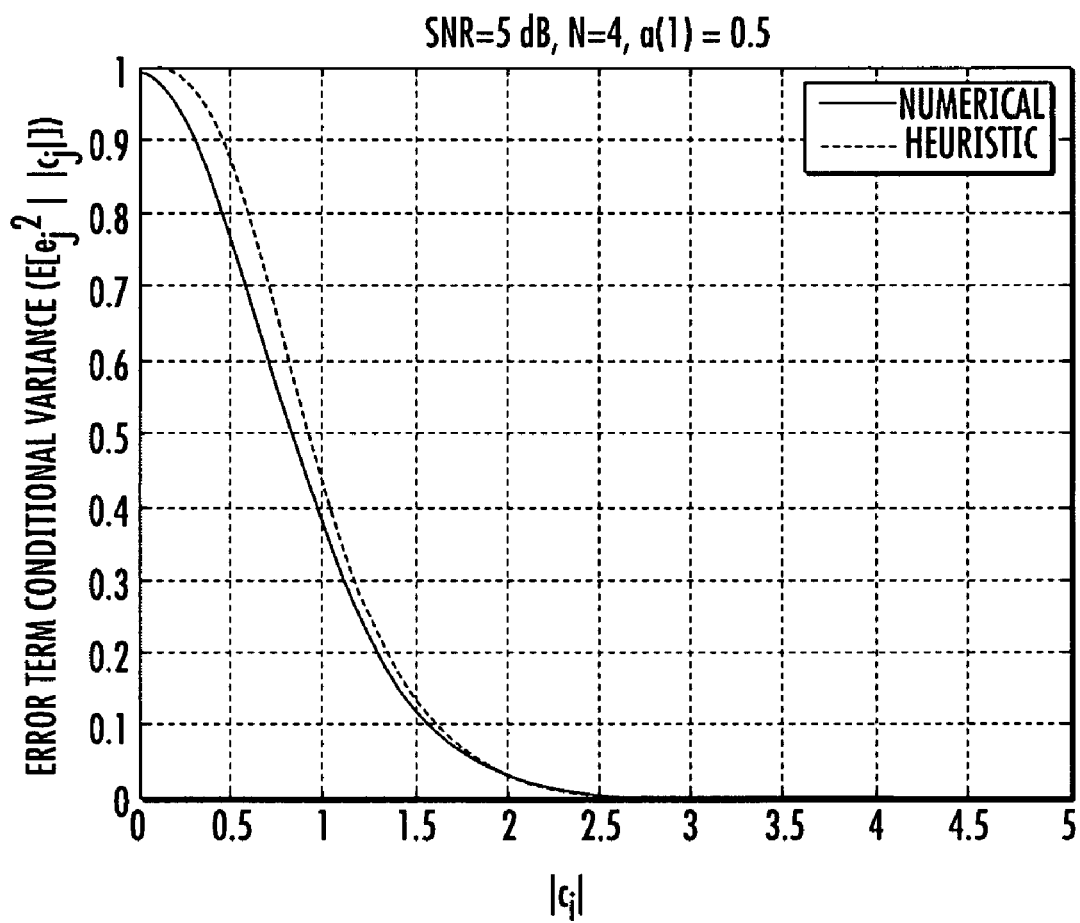
FIG. 3 is a graph showing a heuristic approximation versus numerically obtained value for a 4-user example according to an embodiment of the subject matter disclosed herein.

In equation (17), we use $n_j^2$ that is obtained from equation (5) since we do not condition on $\{X_{kj}\}_k$. This heuristic formulation is based on dividing the region of integration in the expectation operation into a part where the sign of the PCF $\alpha_j(1)$ is different from the sign $b_j$, which occurs with probability $P_j$ (the probability of a decision error on $b_j$ after the first stage), and a part where it is not, which occurs with probability $1-P_j$. The value of $e_j$ is set in each case to be greater or less than unity, respectively, by the PCF computed from the average LLR of $b_j$ after the first stage, where we have implicitly taken $b_j=1$. The error probability $P_j$ is exactly $Q([|c_j|/n_j(1)]$ since the real MAI experienced by a user is exactly Gaussian in that case, and thus we obtained the second quality in equation (16). Another appealing feature of this heuristic is that as a(1) tends to ∞, i.e. the PPIC becomes FPIC, the R.H.S. of equation (8) tends to $4Q([|c_j|/n_j(1)])$ which is the exact conditional variance of the error term $e_j$ for the case of FPIC in equation (6). The heuristic approximation closely follows the conditional RMAI plus noise variance computed numerically as a function of the fading coefficient $|c_j|$ for practical ranges of the system parameters as shown in FIG. 3, which is a graph showing a heuristic approximation of $E[e_j^2|c_j|]$ versus numerically obtained value for a 4-user example with spreading factor, i.e. number of chips per code bit N=4 and SNR=5 dB. Averaging over the user cross-correlations was carried out to obtain the result in FIG. 3. Other values of SNR provided very similar agreement.

The conditional variance of RMAI plus noise thus obtained by substituting equations (16) and (17) in equation (3) is used in the conditional LLR for the Turbo decoder of the user of interest given by equation (2). This technique in the PPIC case is also referred to as ILLR-XC.

Simplified Improved LLR with Cross-correlation (SILLR-X) Information for Partial PIC For the case where we do not utilize information about other users' fading coefficients in the PPIC or the Turbo decoder LLRs we simply use $E[|c_j|]$ in the heuristic of equation (16). Furthermore, to make the variance of the error term user-and time-independent, equation (10) for the MAI plus noise variance of the Turbo decoder LLR. Hence, for equal user energies, $$E[e_c^2] = 4\overline{\alpha_j(1)}Q\left(\frac{\overline{|c_j|}}{n_j}\right) + [1 - \overline{\alpha_j(1)}]^2 \quad (18)$$

where $$\overline{\alpha_j(1)} = \tanh\left[\frac{\alpha(1)2\overline{|c_j^2|}}{n_j^2}\right] \quad (19)$$

The RMAI plus noise variance is now approximately given by $$\Psi_1(2) \cong E[e_c^2]E_c\sum_{j=2}^{K} r_{1j}^2 + \sigma^2 \quad (20)$$

In one embodiment, an ILLR-X may be obtained, but the performance difference with the SILLR-X may be expected to be small.

Improved LLR Using Channel (ILLR-C) Information for Partial PIC

In some applications, it may be useful to obtain PCFs and LLRs utilizing knowledge of the channel coefficients only and not the user cross-correlations. To that end, we use the same form of the heuristic given in equation (16) for the conditional error term variance (with the understanding that the conditioning is on $V_j=\{X_{kj}:k=1,\ldots,K\}$) together with the PCF given by equation (17). The MAI plus noise variance may be taken from equation (13) and finally the RMAI plus noise variance may be obtained from (11).

LLR Using Standard Gaussian Approximation (LLR-SGA) for Partial PIC

The following formulas may be used in cases where no information about the other users' fading coefficients or cross-correlations in either the PPIC or LLR of the Turbo decoders is used:

$$\psi_1(2) \cong E[e_c^2]\frac{(K-1)E_c}{N} + \sigma^2 \tag{21}$$

and $E[e_c^2]$ is obtained from equation (18) with equation (19) and the MAI plus noise variance is obtained from equation (10).

Table 1 summarizes the PCFs and the decoder LLRs formulations associated together in the various schemes proposed from PPIC.

TABLE 1

Processes for PCFs and LLRs in PPIC techniques

| PPIC | PCF: Equation (15). Uses $n_j^2$ from | Decoder LLR |
|---|---|---|
| ILLR-XC | Equation (8) | Equations (3, 16, 17) with $n_j^2$ from (5) |
| SILLR-X | Equation (5) | Equations (20, 18, 19) with $n_j^2$ from (10) |
| ILLR-C | Equation (13) | Equations (11, 16, 17) with $n_j^2$ from (13) |
| LLR-SGA | Equation (10) | Equations (21, 18, 19) with $n_j^2$ from (10) |

Figure 4:
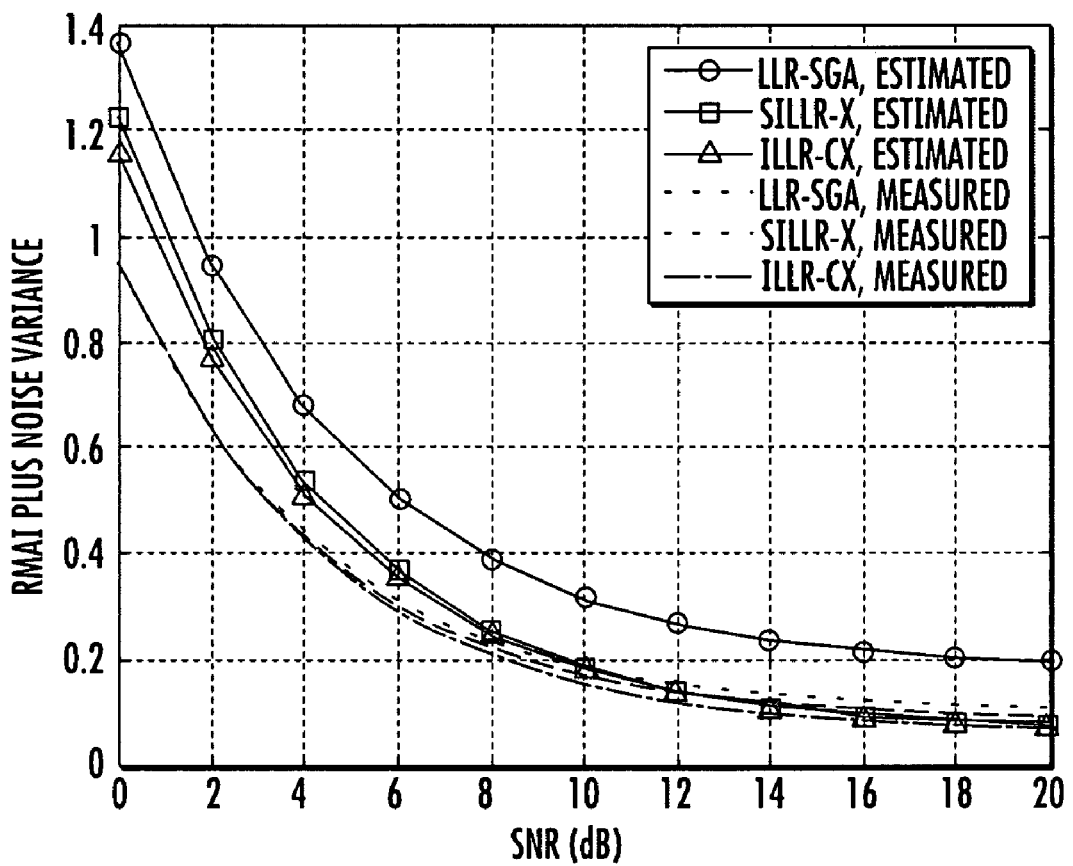
FIG. 4 is a graph showing measured and estimated RMAI plus noise variance using different 2-stage PPIC techniques according to embodiments of the subject matter disclosed herein.

It should be noted that the inaccuracies due to these approximations can be compensated for by including variance mismatch factors, to be obtained empirically, in the LLRs supplied to the decoders. FIG. 4 is a graph showing measured and estimated RMAI plus noise variance using different 2-stage PPIC techniques with 4 users, N=4, and a(1)=0.5 In particular, FIG. 4 shows the measured RMAI plus noise variance as well as a sample mean taken over the estimates, using the three aforementioned techniques, of the conditional RMAI plus noise variance.

The measured RMAI plus noise variance may be the best (smallest) for the PIC scheme using ILLR-XC and is a little higher when using SILLR-X and worst of all when using LLR-SGA. It is noted that these slight differences result in significant performance differences in later stages. Further, it is noted that these estimated variances using LLR-SGA is relatively far from the measured variance whereas the two improved schemes result in better estimates. The above system is a 4-user with a spreading factor N=4 and similar results are obtained for N=6.

Multi-Stage PPIC

Referring to FIG. 1, a bank of K matched filter correlators or despreaders 104 in first stage 102 despreads each user's signal. The first bank of Turbo decoders, in blocks 106 of stage 2 108, produces soft output LLRs, denoted by $\{L_{oj}(2)\}_j$, that are improved by the iterations inside the Turbo decoders. These output LLRs are then re-interleaved and applied to estimators 110. The outputs of estimators 110 are then supplied to the following PIC stage(s) 112, which includes PICs and single-user decoders in block 115. Since the PIC occurs at the code bit level, the Turbo decoders in stage 2 108 are modified to produce LLRs for the parity as well as the systemic bits. The process is repeated until the final stage L 112 where the PIC is followed by deinterleavers and single-user decoders producing hard decisions on the information bits of each user. Since the soft Turbo decoder outputs are improved LLRs, the same non-linear estimators are applied and therefore the PCFs are computed as $\alpha_j(m)=\tan h[\alpha(m)L_{oj}(m)]$. However, these are not MMSE estimates except in first stage 102 at MMSE estimators 116. An estimate of the RMAI plus noise variance after stage 2 108, i.e. after the first bank of Turbo decoders, may be difficult to compute. However, the conditional Gaussian approximation is maintained. Hence, $\psi_1(m)$ is computed as follows:

$$\psi_1(m) \cong V_{ILLR-XC}(m)\sum_{j=2}^{K} X_{j1}^2 r_{1j}^2 + \sigma^2 \tag{22}$$

$$\psi_1(m) \cong V_{SILLR-X}(m)E_c\sum_{j=2}^{K} r_{1j}^2 + \sigma^2 \tag{23}$$

$$\psi_1(m) \cong V_{ILLR-C}(m)\frac{1}{N}\sum_{j=2}^{K} X_{j1}^2 + \sigma^2 \tag{24}$$

$$\psi_1(m) \cong V_{LLR-SGA}\frac{(K-1)E_c}{N} + \sigma^2 \tag{25}$$

where $V_x(m)$ is the variance mismatch factor for scheme X at each stage m and these factors may be obtained empirically. It is noted that these mismatch factors in the case of multi-stage PPIC are not for fine-tuning the RMAI plus noise variance estimates but are a necessary part of obtaining such estimates. Cross-correlations computations and channel estimates 120 and MAI/RMAI plus noise variance estimates 122 as described herein may also be provided to each of the stages.

Regarding PPIC, a weighted average of previous stage decisions may be applied to the following IC stage. Either uncoded systems or several stages of PIC may be applied before any decoding occurs.

Improved Log-Likelihood Ratios for Conventional Detection

As described herein, the utilization of the fading coefficients and cross-correlations of other users in the single-user decoders as well as, in the case of PPIC, obtain better soft estimates of each user's bits. The natural context of this technique is in the case of multi-user receivers where such information about the other users' signals must be computed, e.g. to perform PIC. Nevertheless, the performance gains that are afforded by the use of improved LLRs of single-user Turbo decoders may be had in the case of systems employing conventional matched filter detectors, i.e. without PIC. In fact, the performance gains compared to the conventional LLRs in this case may be more pronounced relative to the case of PIC schemes as shown below in performance comparisons. This is probably due to the fact that all MAI terms are fully present in each user's signal at the input to the single-user decoders. Furthermore, the SGA of conditional SGA may be better or exact, respectively, when modeling the MAI plus noise. Referring to FIG. 1, MMSE estimators 116 of first stage 102 and a PIC block 114 of the second stage would be removed and the first bank of Turbo decoders would provide final decisions. Following the above notation, three improved LLRs, the ILLR-XC, ILLR-C, and ILLR-X were defined using equations (8), (13), and (5), respectively, for the computation of the MAI plus noise variance. The conventional technique that uses equation (10) for MAI plus noise variance computation is referred to herein as LLR-SGA.

Performance Comparisons for the First Aspect

The bit error rate performance of the different techniques presented hereinabove are compared in this section using computer simulations. For all of the simulation results presented in this section, the parallel concatenated Turbo encoder with recursive systematic encoders with generator polynomials octal (used in equations 17, 18) was used with an overall code rate of ½. Five iterations internal to the Turbo decoder are used throughout using max*-log-MAP. A random Turbo interleaver was used of size I=1024. For the multi-stage case we simulate only two stages of PPIC, i.e. a 3-stage system. Despite using independent fading coefficients interleavers and deinterleavers are required for the 3-stage PPIC scheme to randomize the (soft) burst of poor estimates out of the first Turbo decoder bank. These channel interleavers are random interleavers of size 10 frames and are unique to each user. Equal average user energies are considered throughout.

Figure 5:
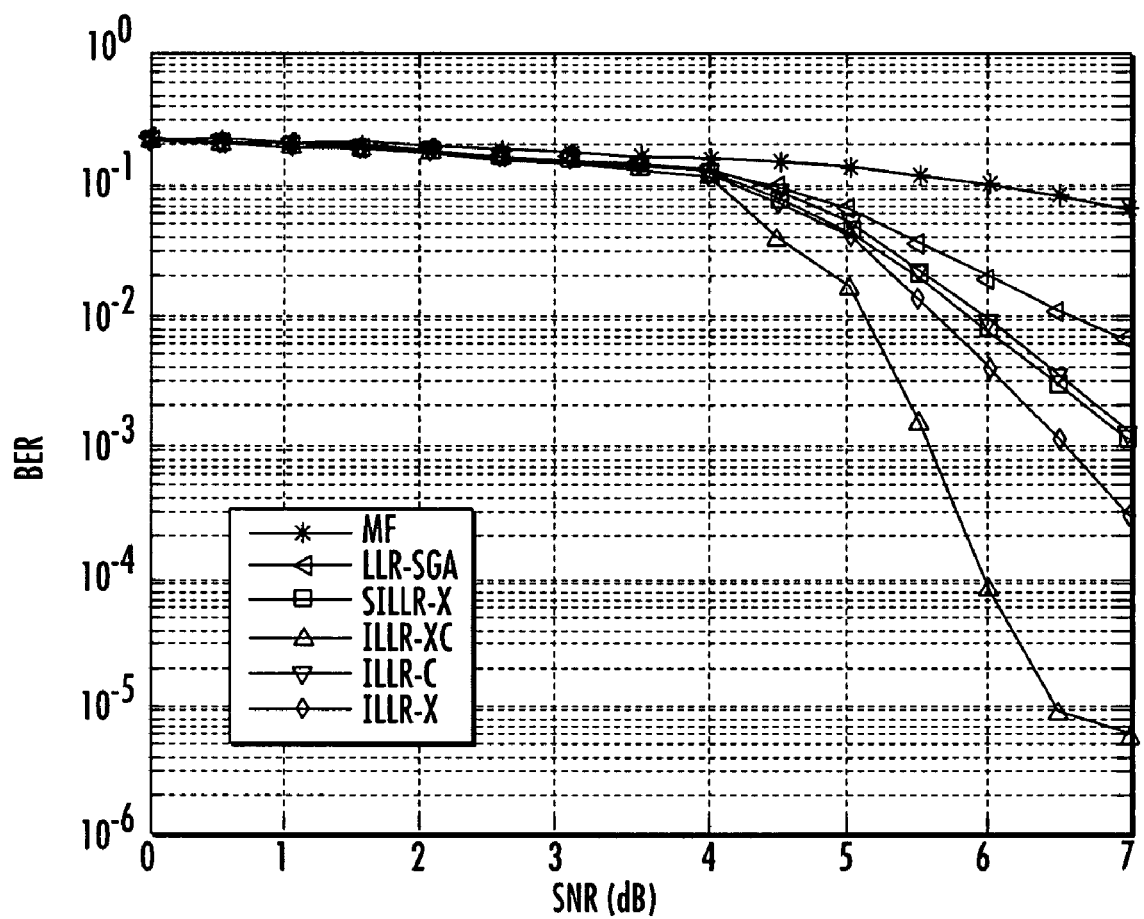
FIG. 5 is a graph showing the performance of different techniques with FPIC for a 4-user system according to an embodiment of the subject matter disclosed herein.

FIG. 5 is a graph showing the performance of different techniques with FPIC for a 4-user system with N=4, i.e. full loading. The advantage of the improved schemes is clear reaching 2 dB between the best technique ILLR-XC and the conventional technique LLR-SGA. ILLR-C and SILLR-X are nearly identical and worse than IILR-X indicating that cross-correlation information is more important to the decoders than other users' channel information. The figure also shows the matched filter (MF) results.

Figure 6:
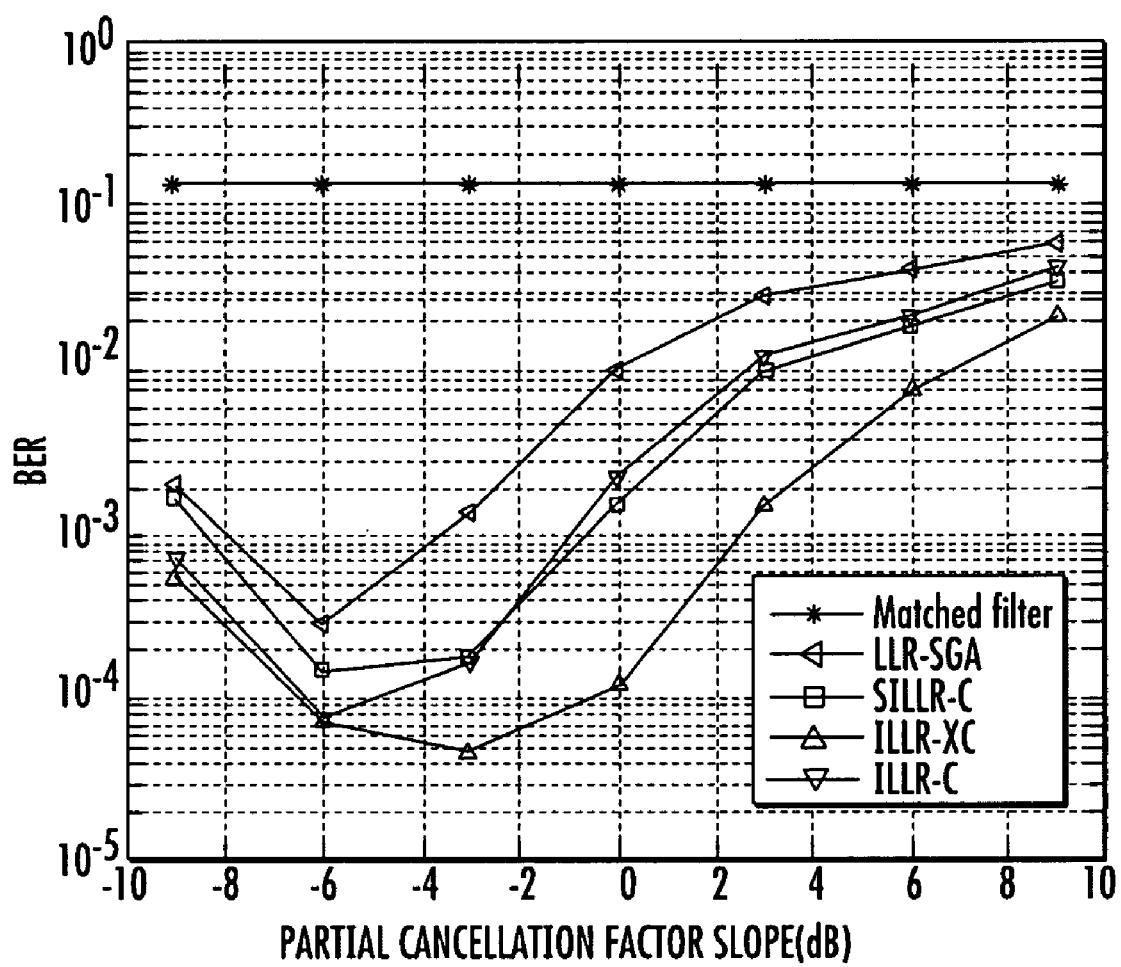
FIG. 6 is a graph showing the performance results of the different techniques according to an embodiment of the subject matter disclosed herein for one stage of PPIC.

Before presenting the PPIC schemes, first the slope factor a(1) of the first stage is examined. FIG. 6 is a graph showing the performance of the different techniques for one stage of PPIC at an SNR of 5 dB as the slope parameter a(1) is varied. This example is for 4 users, where N=4. The optimum slope value for ILLR-CX is close to 0.5 while for the remaining techniques it is 0.25. Optimization of the slope factor will in general depend on the SNR and the scheme used but for SNR=4 dB (not shown) the same results appeared. Note that as a(1) tends to ∞ the performance tends to that of FPIC and as a(1) tends to 0 performance is that of the conventional matched filter detector, shown in the figure for reference.

Figure 7:
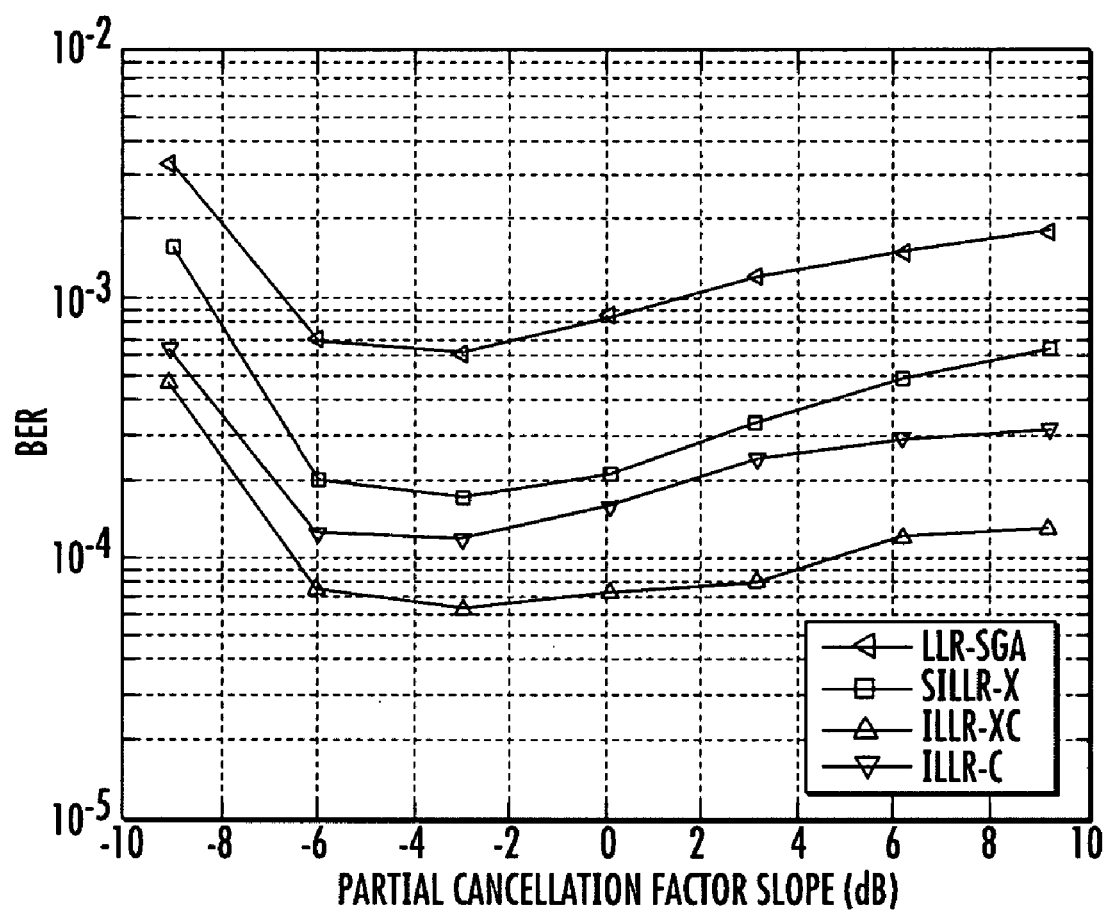
FIG. 7 is a graph showing an example of the performance results of a 3-stage PPIC according to an embodiment of the subject matter disclosed herein.

For 3-stage PPIC, the slope a(2)=0.5 was found to give the best performance for all three techniques, although the dependence on the slope in the positive direction is much weaker in the second stage, as shown in FIG. 7. FIG. 7 is a graph showing an example with 4 users, N=4, 3-stage PPIC for different values of the slope parameter a(2), SNR=4 dB, and a(1) is optimized for each scheme. This indicates that PPIC is not significantly superior to FPIC as early on as the third stage, i.e. second stage of PIC.

Figure 8:
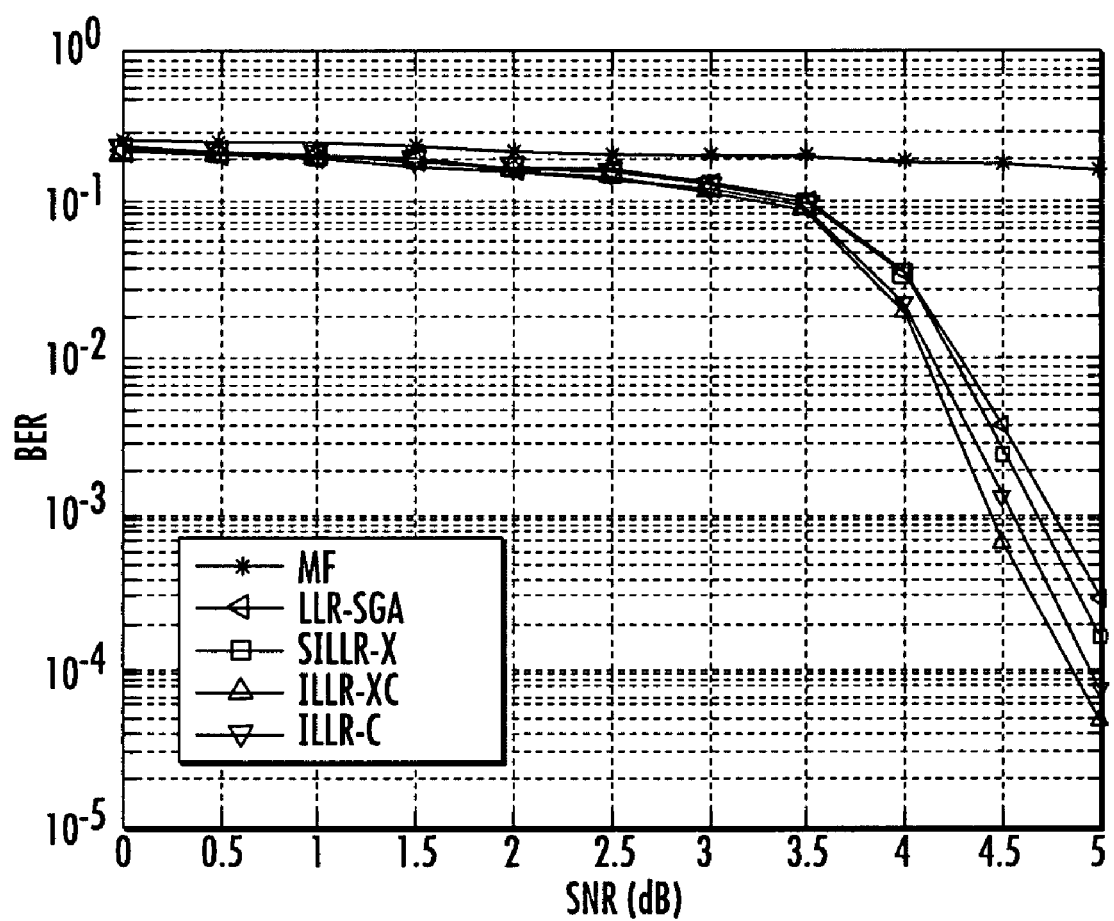
FIG. 8 is a graph showing performance results of four PPIC techniques according to an embodiment of the subject matter disclosed herein for a 4-user system.

FIG. 8 is a graph showing the performance of the four PPIC techniques for a 4-user system with N=4. The conventional single-user matched filter detector with the conventional LLR used in the Turbo decoders (MF, LLR-SGA) is shown for reference. The improvement due to the ILLR-XC over the LLR-SGA scheme is about 0.5 dB, i.e. less than in the FPIC case. It is noted that the ILLR-C is almost identical to the ILLR-X in the case of PPIC. By comparison to FIG. 5, it is noted that PPIC improves greatly over FPIC such that the LLR-SGA in the PPIC case outperforms the ILLR-XC in the FPIC case.

Figure 9:
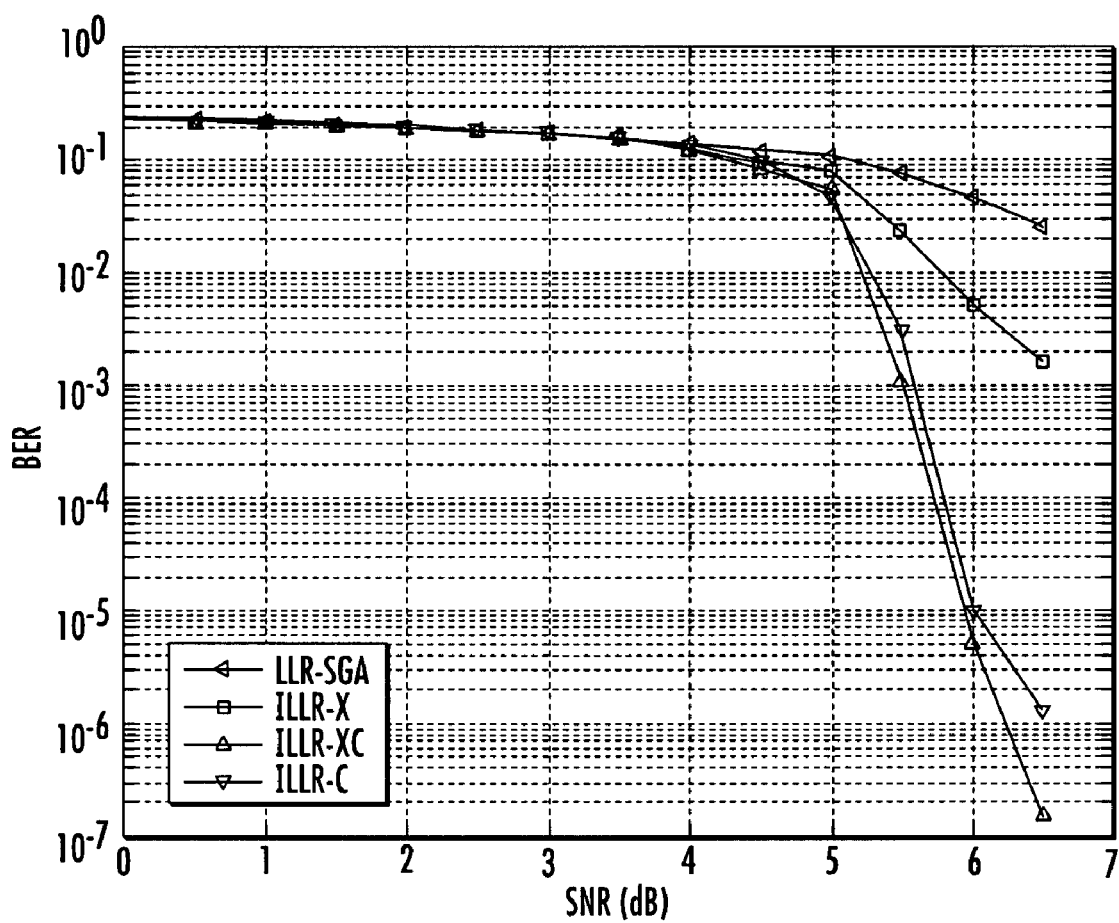
FIG. 9 is a graph showing performance comparisons of ILLR-XC, SILLR-X, and LLR-SGA for 4 users according to an embodiment of the subject matter disclosed herein.

The performance after two stages of PPIC is now considered. Referring to equations (22)-(25), $V_x(2)=-10$ dB for the ILLR-XC and SILLR-X techniques and $V_x(2)=+5$ dB for LLR-SGA to give the best performance for the SNR range 3.5 to 5 dB, which is our range interest. Applying these variance correction factors, we obtain the performance results shown in FIG. 9, where the performance gain of the improved techniques persists. FIG. 9 is a graph showing the performance comparisons of ILLR-XC, ILLR-X, ILLR-C, and LLR-SGA for 4 users, where N=2, 3-stage PPIC, and a(2)=0.5 for all schemes and a(1)=0.5 for ILLR-XC and a(1)=0.25 for the remaining schemes.

Figure 10:
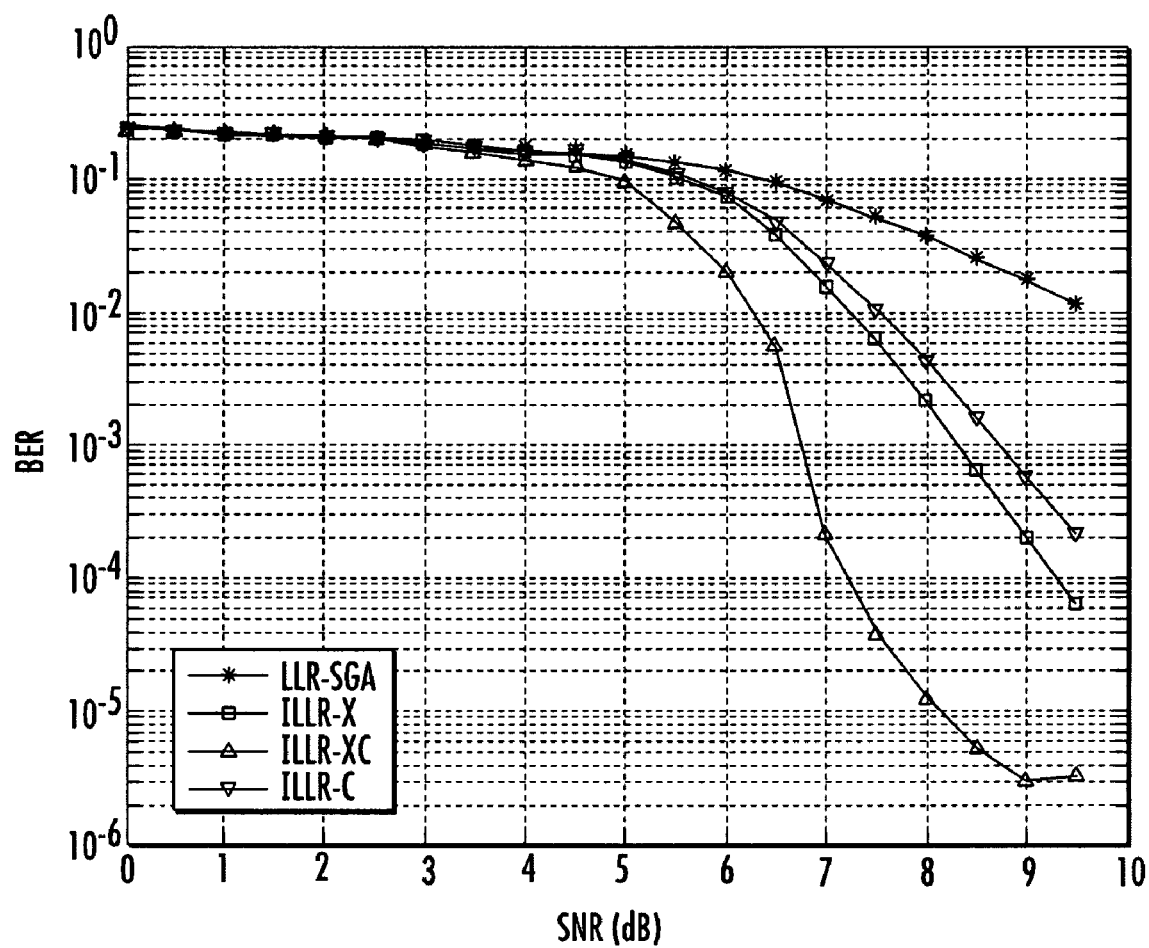
FIG. 10 is a graph showing performance comparisons for a 4-user system with a single-user decoder according to an embodiment of the subject matter disclosed herein.
Figure 11:
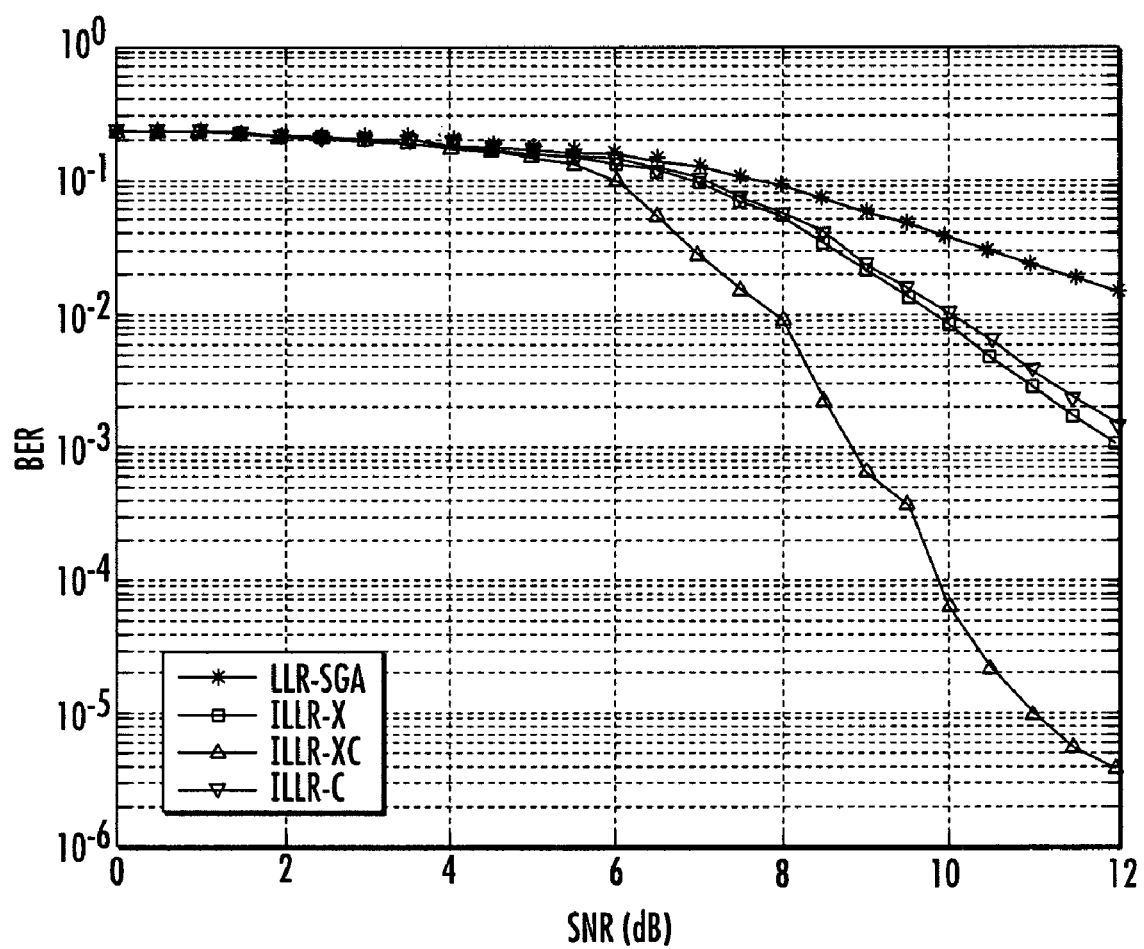
FIG. 11 is a graph showing performance comparisons in an 8-user system with a single-user decoder according to an embodiment of the subject matter disclosed herein.

Finally, the improved LLR is compared with the conventional LLR used in the single-user Turbo decoders with the conventional matched filter detector. FIG. 10 is a graph showing the performance comparisons for a 4-user system with N=4 and with a single-user decoder. Impressive performance gains are realized. FIG. 11 is a graph showing the performance comparisons in an 8-user system with N=8 with a single-user decoder. In this example, the performance gains are about the same.

Now, the complexity of the proposed techniques with respect to the first aspect is considered where a simple analysis counting the number of real multiplications, additions, and table-look ups per code bit per stage have been carried out. It is assumed that the complex channel coefficients $\{c_j\}$, the user cross-correlations, the average user energy $E_c$ and the ambient noise variance $\sigma^2$ are available. Only the computations needed to obtain the LLRs and PCFs are considered here since the PIC operations are the same for all FPIC or PPIC techniques. Further, a table look-up is used whenever appropriate, e.g. in computing the Q-function and equation (7). Based on this, it has been determined that all the ILLR schemes require operations of time complexity $O(K^2)$ per code bit per stage. The LLR-SGA computation on the other hand would require complexity of order $O(K)$. However, for PIC schemes it is known that the complexity is $O(K^2)$ per bit per PIC stage for a single-antenna system on a frequency-flat channel fading channel if the PIC is carried out in the de-spread domain. Hence, the computations required for the improved LLRs do not entail an increase in the complexity order for PIC techniques. The singe-user matched filter detector obviously has complexity $O(K)$. Hence, the use of improved LLR in this case would entail an increase in the complexity order.

Improved LLRs were derived for single user decoders used with full and PPIC detectors in DS-CDMA systems. In two-stage PPIC, the PCFs were obtained from an MMSE estimator based on the LLR of each bit after the first stage. The LLR was enhanced using knowledge of the other users' fading coefficients and user cross-correlations leading to the true conditional MMSE estimators, thus improving the PPIC itself. An enhanced estimate of the variance of the RMAI plus noise after PPIC was derived. Several variations of the improved LLRs depending on the available information to the decoders and PCF computation block were considered. Specifically, LLRs and PCFs with knowledge of both the user channels and cross-correlations (ILLR-XC), the user cross-correlations only (ILLR-X and SILLR-X), and the user channels only (ILLR-C) were considered. The proposed schemes were compared to the conventional scheme (LLR-SGA) which obtains a LLR that uses a time- and user-independent estimate of the (R)MAI plus noise variance. Significant performance gains were demonstrated for fully-loaded systems, i.e. K=N, for PIC schemes. The improved LLRs were also applied to receivers with conventional matched filter detectors and more impressive gains were realized, even though the computational effort to obtain the improved LLRs is only utilized in the decoders and not in the detection process. In the latter case, even moderately loaded systems with K/N=⅔ the improved LLRs gave significant performance gains. It is also noted that PPIC schemes with the conventional LLR outperform FPIC with the best improved LLR. Extending the proposed schemes to multistage iterative PPIC, significant performance improvements due to the improved LLRs with only two stages of PPIC may be realized.

Synchronous systems were also considered with respect to the first aspect. However, derivations of the conditional variance estimates for the asynchronous case have been carried out. It is noted that all the conditional variance estimates and improved LLRs are applicable to systems using single-user Viterbi decoders but soft outputs need to be produced in that case for multi-stage PPIC implementations. Adding a third stage of PIC may be useful to observe convergence. The last case may yield more impressive improvements for the PPIC techniques.

Additional Examples of Variance Model Equations

The following equations may represent conditional variance in the case of fixed partial PIC (FPPIC) for ILLR-XC, ILLR-X/SILLR-X, ILLR-C, and LLR-SGA where $\alpha$ is the fixed partial cancellation factor:

ILLR-XC $$\psi_1(2) \cong \sum_{j=2}^{K} r_{1,j}^2 X_{j1}^2 \left[ 4\alpha Q\left(\frac{|c_j|}{\eta_j}\right) + (1-\alpha)^2 \right] + \sigma^2$$

where the MAI plus noise variance is given by equation (8)

ILLR-X/SILLR-X $$\psi_1(2) \cong \sum_{j=2}^{K} E_j r_{1,j}^2 \left[ 2\alpha \left\{ 1 - \sqrt{\frac{E_j}{E_j + \eta_j^2}} \left( \frac{\eta_j^2}{2(\eta_j^2 + E_j)} + 1 \right) \right\} + (1-\alpha)^2 \right] + \sigma^2$$

where the MAI plus noise variance is given by equation (5) for ILLR-X and is given by equation (10) for SILLR-X.

ILLR-C $$\psi_1(2) \cong \frac{1}{N} \sum_{j=2}^{K} X_{j1}^2 \left[ 4\alpha Q\left(\frac{|c_j|}{\eta_j}\right) + (1-\alpha)^2 \right] + \sigma^2$$

where the MAI plus noise variance is given by equation (13)

LLR-SGA $$\psi_1(2) = \frac{1}{N} \sum_{k \neq j} E_j [4\alpha P_j + (1-\alpha)^2] + \sigma^2$$

For equal energy, the following equation may be applied to the LLR-SGA case:

$$\psi_1(2) = \frac{(K-1)E_c}{N} [4\alpha P_e + (1-\alpha)^2] + \sigma^2.$$

The following equations may represent conditional variance in the case of no IC with multi-path fading. The LLR for the Turbo decoder of user j may be represented by:

$$L_j = \sum_{m=1}^{M} \frac{2 y_{jm} |c_{jm}|}{\eta_{jm}^2}$$

where $\eta_{jm}^2$ is the MAI plus noise appearing in the signal of user j for path m, M is the total number of paths. In the case of ILLR-XC, the following equation may be used:

$$\eta_{jm}^2 = \sum_{k=1}^{K} \sum_{p=1}^{M} r_{jm,kp}^2 X_{kp,jm}^2 + \sigma^2 \quad p \neq m \text{ at } k = j.$$

$X_{kp,jm} = |c_{kp}| \cos(\theta_{kp} - \theta_{jm})$ is the real fading coefficient due to the MAI from user k path p that is experienced by user j path m and $r_{jm,kp}$ is the normalized cross-correlation between user j path m and user k path p.

In the case of SILLR-X, the following equation may be used:

$$\eta_{jm}^2 = \sum_{k=1}^{K} \sum_{p=1}^{M} r_{jm,kp}^2 E_{kp} + \sigma^2 \quad p \neq m \text{ at } k = j.$$

In the case of ILLR-C, the following equation may be used:

$$\eta_{jm}^2 = \frac{1}{N} \sum_{k=1}^{K} \sum_{p=1}^{M} X_{kp,jm}^2 + \sigma^2 \quad p \neq m \text{ at } k = j.$$

In the case of LLR-SGA, the following equation may be used:

$$\eta_{jm}^2 = \frac{1}{N} \sum_{k=1}^{K} \sum_{p=1}^{M} E_{kp} + \sigma^2 \quad p \neq m \text{ at } k = j.$$

For equal energy, the following equation may be applied to the case of LLR-SGA;

$$\eta_{jm}^2 = \frac{1}{N} \sum_{p \neq m} E_{jp} + \frac{(K-1)E_c}{N} + \sigma^2$$

The following equations may represent conditional variance in the case of full PIC (FPIC) with multi-path fading for ILLR-XC, ILLR-C, and LLR-SGA. The LLR for user j may be represented by the following equation:

$$L_j = \sum_{m=1}^{M} \frac{2 y_{jm} |c_{jm}|}{\psi_{jm}}$$

The conditional variance may be represented for different techniques as follows:

ILLR-XC $$\psi_{jm}(2) = 4 \sum_{k \neq j} \sum r_{jm,kp}^2 X_{kp,jm}^2 P_k + \sigma^2$$

where:

$$P_j = Q(\sqrt{2\gamma_j})$$

where $$\gamma_j = \sum_{m=1}^{M} \frac{|c_{jm}|^2}{2\eta_{jm}^2}$$

is the conditional SNR for user j and $\eta_{jm}^2$ as in the case of no IC with multi-path fading.

ILLR-C $$\psi_{jm}(2) = \frac{4}{N} \sum_{k \neq j} \sum X_{kp,jm}^2 P_k + \sigma^2$$

with $P_j$ as above
where $\eta_{jm}^2$ as above.

LLR-SGA $$\psi_{jm}(2) = \frac{4}{N} \sum_{k \neq j} \sum E_{kp} P_k + \sigma^2$$

where $$P_j = \frac{1}{2} \sum_{m=1}^{M} \pi_{jm} \left[ 1 - \sqrt{\frac{\gamma_{jm}}{1+\gamma_{jm}}} \right]$$

and $$\pi_{jm} = \prod_{\substack{i=1 \\ i \neq m}}^{M} \frac{\gamma_{jm}}{\gamma_{jm} - \gamma_{ji}}$$

and where $$\gamma_{jm} = \frac{E_{cm}}{\eta_{jm}^2}$$

and $\eta_{jm}^2$ as above.

For equal energy, the variance may be represented as:

$$\psi_{jm}(2) = \frac{4(K-1)E_c}{N} P_c + \sigma^2$$

where $P_c$ equals $P_j$ when constant for all users as $E_{jp}=E_{kp}$ for all p with $\eta_{jm}^2$ as above and $P_j$ as above.

Figure 12:
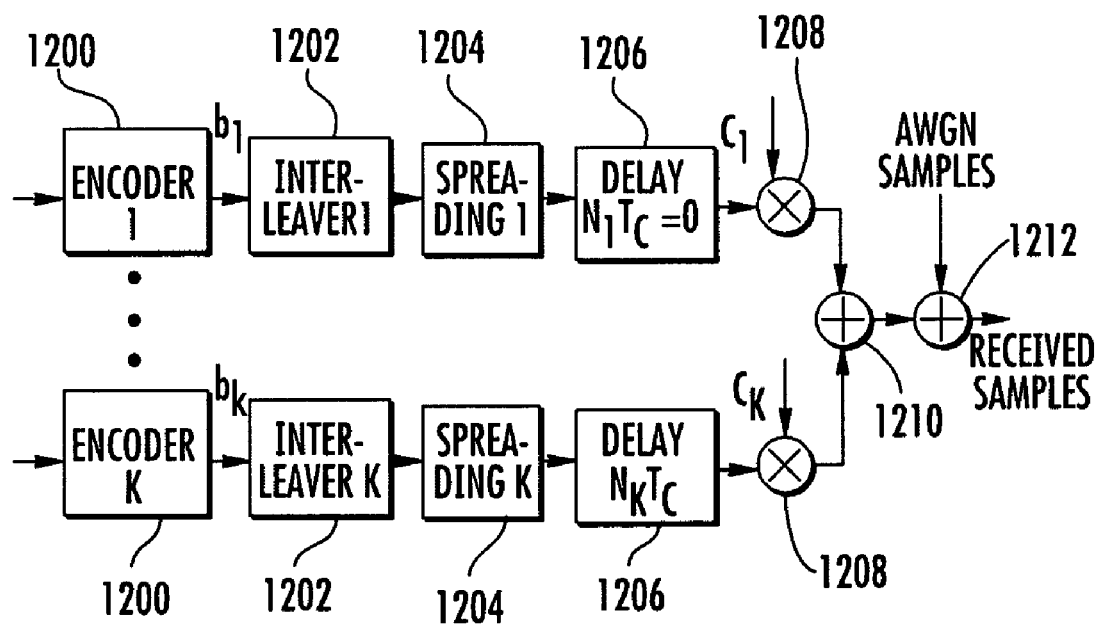
FIG. 12 is a conceptual diagram illustrating the transmitted and channel for all users.

Multiple-Access Communication System Model and Receiver Structures According to a Second Aspect In a multiple-access communication system to which embodiments of the subject matter disclosed herein may be applied, K users may transmit asynchronously using BPSK DS-CDMA signaling over a Rayleigh fading frequency-non-selective channel with AWGN. For convenience, a chip-synchronous model is assumed for convenience, although the techniques proposed are applicable to chip-asynchronous systems. At the receiver, a bank of K matched filter correlators or despreaders despreads each user's signal. Based on the first stage, hard decisions on each user's bit, full PIC is applied before decoding. At any code bit interval, the spreading factor-normalized output of the second stage after PIC and coherent phase compensation for user 1, the user of interest, is given by $$y_1(2) = |c_1|b_1 + \sum_{j=2}^{K} |c_j|\cos(\theta_j - \theta_1)[r_{1,jA}e_{jA} + r_{1,jD}e_{jD}] + n_1 \quad (26)$$

where, for user j, $c_j=|c_j|\exp(i\theta_j)|$ is the complex Gaussian fading coefficient, $b_j=\pm 1$ is the transmitted code bit, $r_{1,j}$ is the normalized cross-correlation between user 1 and user j, $e_j=b_j-\hat{b}_j(1)$ is the first stage decision for user j and $e_j$ takes values from $\{-2, 0, 2\}$ representing the error in the first stage decision of user j, and $n_1$ is the noise term of user 1 having variance $\sigma^2$. The additional A and D subscripts refer to the "Advanced" and "Delayed" parts, respectively, of the MAI referred to the current bit interval of the user of interest, user 1. It is noted that the cross-correlations thus defined are partial cross-correlations over the portion of overlap between the bit of user 1 and the advanced or delayed bits of the interfering users. FIG. 12 is a conceptual diagram illustrating the transmitted and channel for all users K. Referring to FIG. 12, encoders 1200 receives user signals for communication via a multiple-access communication system. The user signals are encoded by encoders 1200 as code bits b. The code bits are subsequently interleaved by interleavers 1202. Next, the signals of the different users are spread over a wide frequency band by spreading functions 1204 using different spreading codes. Delay blocks 1206 simulate the effect of different user signal delays at the receiver in multiples of chip durations. The resulting signal is combined with the complex Gaussian fading coefficient c at multipliers 1208. The signals are added together at adder 1210. Further, AWGN samples are added to the resulting signal at adder 1212 to result in the signal containing information about the users in a multiple-access communication system employing spreading sequences. The signal model output by adder 1212 can be used as input to a demodulator model in accordance with the subject matter disclosed herein. For typical transmission rates and mobile speeds, the fading coefficients are fixed over several code bit intervals. Therefore, in this analysis, the interfering users (2, . . . , K) experience independent fading that is static at least across bit boundaries falling within the bit interval of our user of interest.

Likelihood Ratios for Single-User Decoders after PIC

Following the PIC stage, an estimate of the RMAI plus noise variance is needed by the Turbo decoder of each user. A typical approach is to estimate the variance of the RMAI due to some user j and then add the variances of the RMAI terms due to all users and noise. This ignores the dependence between the RMAI terms of the different users and noise whereas the dependence may or may not be significant depending on various factors such as the number of users, spreading factor, SNR, etc. In the following sections, the conventional approach in estimating RMAI variance is presented and followed by derivation of improved methods for estimating RMAI variance.

Conventional RMAI Variance Estimation

The conventional approach in estimating the variance of the RMAI after PIC is to assume that the RMAI is approximately Gaussian and to ignore the dependence between the quantities constituting the RMAI terms. Referring to equation (1) above, it is noted that by symmetry arguments the mean of the RMAI due to user j is given by $E\{|c_j| \cos(\theta_j-$ $\theta_1)(r_{1jA}e_{jA}+r_{1jD}e_{jD})]^2\}$ where $E\{\ \}$ denotes expectation. By expansion and ignoring the dependence between the product terms, the mean of the square of each term may be separately obtained. The cosine squared term is very weakly dependent with the other terms and can be safely taken out where it is easy to show that its expectation is equal to ½. The $E\{|c_j|^2\}$ is given by $2E_j$ where $E_j$ is the average code bit energy for user j since it is defined by $E_j=\frac{1}{2}E[|c_j|^2]$. The mean of the cross-product term involving the advanced and delayed terms is zero by symmetry arguments. It can be shown that $E[r_{1jA}^2+r_{1jD}^2]=N_j/N^2+(N-N_j)/N^2=1/N$ where $N_j$ is the delay of user j in number of chips relative to user 1 and N is the spreading factor defined as the number of chips per code bit. Accordingly, an expression for the total RMAI plus noise variance in the signal of user 1 is given by $$\psi_{1,CONV} \cong \frac{4}{N}\sum_{j=2}^{K} E_j P_j + \sigma^2 \qquad (27)$$

where $P_j$ is the error probability for user j at the output of the matched filter and is obtained from the error probability expression for a single user on a flat fading channel and applying the Gaussian approximation to model the MAI. Based on the above simplifications, the conventional approach gives the same expression for RMAI plus noise variance as for the synchronous case. This is a baseline technique that is used herein for comparison with the improved techniques described hereinbelow.

Improved Conditional RMAI Variance Estimation for Asynchronous Channels

CDMA systems with long spreading sequences result in cross-correlations that appear random from one bit to another. Recognizing that the RMAI terms consist of the product of the time-varying but known cross-correlations and the approximately Gaussian interference from other users, the RMAI may be conditionally Gaussian with time-dependent variance and conditioned on known cross-correlations. The next requirement is to obtain an accurate estimate of the variance of this approximately conditionally Gaussian RMAI.

Initially, the conditional variance $\psi_{1j}$ of the RMAI term in the signal of user 1 due to a user j is obtained where the conditioning is on the user cross-correlations, and we drop the parenthesis with the stage number except in the final result for convenience. Next, the variances of all RMAI terms plus noise is added while ignoring the dependence between the RMAI terms and noise. However, comparisons between the measured RMAI plus noise variance and the improved variance estimates described herein indicate that this is a valid assumption. By symmetry arguments, the means of the RMAI due to any user j is zero. Based on these reasons, the conditional variance may be provided by the following equation:

$$\psi_{1j} \cong E\{f|c_j|\cos(\theta_j-\theta_1)(r_{1jA}e_{jA}+r_{1jD}e_{jD})]^2|\{r_{kjA,D}\}\} \qquad (28)$$

where $E\{x|y\}$ denotes the conditional expectation of x given y and $\{r_{kjA,D}\}$ is a term indicating all needed cross-correlations. As mentioned in the preceding section, the cosine squared term can be separated from the other terms and its expectation equal to ½. Based on these reasons, the conditional variance may be provided by the following equation:

$$\psi_{1j} \cong \qquad (29)$$
$$\frac{1}{2}\{r_{1jA}^2 E[(|c_j|e_{jA})^2] + r_{1jA}r_{1jD}E[(|c_j|e_{jA}e_{jD})^2] + r_{1jD}^2 E[(|c_j|e_{jD})^2]\}$$

where the notation is provided for convenience to indicate conditioning. The mean of the middle term can be shown to be zero by symmetry arguments. The expectation in the first and third terms are identical and may be computed. The desired variance may thus be written as $\psi_{1j}=\psi_{1jA}+\psi_{1jD}$, i.e. consisting of terms due to each of the advanced and delayed bits of the interfering users. These terms may be expressed as $$\psi_{1jA} \cong 2E_j r_{1jA}^2 \left\{1 - \sqrt{\frac{E_j}{E_j+n_{jA}^2}}\left(\frac{n_{jA}^2/2}{n_{jA}^2+E_j}+1\right)\right\} \qquad (30)$$

with an identical expression for the term due to the delayed bit where the subscripts A are substituted for by the subscripts D. In the above expression, $n_{jA}^2$ ($n_{jD}^2$) is the conditional variance of the MAI plus noise experienced by the advanced (delayed) bit of user j before PIC when conditioning on all user cross-correlations $\{r_{jAk}\}(\{r_{jDk}\})$ with k, j=1, . . . , K and k≠j. Note that the cross-correlations thus defined are those between the whole advanced (delayed) bit of user j and the chips of all other interfering users k. They are therefore different, in the asynchronous case, from the partial cross-correlations defined earlier $\{r_{1jA},r_{1jD}\}$ in equation (28). In coherent demodulation of the bit of user 1, the fading coefficient $c_1$ may be estimated and therefore the conditional MAI plus noise variance experienced by the advanced bit of user j is expressed as $$n_{jA}^2 = \frac{1}{2}|c_1|^2 r_{jA1}^2 + \sum_{k\neq j,1} E_k r_{jAk}^2 + \sigma^2 \qquad (31)$$

with an identical expression for the conditional MAI plus noise variance experienced by the delayed bit of user j where the subscripts A are substituted for by the subscripts D.

Finally, the expression for the total RMAI plus noise variance seen by user 1 conditioned on the user cross-correlations defined above may be written as $$\psi_1 = \sum_{j=2}^{K} \psi_{1jA} + \psi_{1jD} + \sigma^2. \qquad (32)$$

The LLR for the Turbo decoder may be written as $2|c_1|y_1(2)/\psi_1$ where the denominator is a time-varying, and more accurate, estimate of the RMAI variance. This LLR is referred to as the improved LLR with conditioning (ILLRC) to distinguish it from the ILLR where no conditioning on $|c_1|$ takes place in computing $\psi_1$ (2).

Simplified Conditional RMAI Variance Estimates

The computational complexity involved in applying the ILLRC may be reduced in several ways. One technique is to average over the other user cross-correlations in the expressions for the MAI plus noise variance in equation (31). This means that in obtaining $\psi_1$ (2), conditioning is based only on $\{r_{1jA},r_{1jD}\}$ and $\{r_{jA1},r_{jD1}\}$. The result is a MAI plus noise variance seen by user j that is, nevertheless, time-varying due to the first term involving $r_{j1A}(r_{j1D})$ and $|c_1|$. This technique may be referred to as the simplified ILLRC (SILLRC). It is noted that the other user cross-correlations must be computed anyway to demodulate the signals of the other users.

A further simplification is to average over $\{r_{jA1}, r_{jD1}\}$ ignoring the dependence between these full cross-correlations and the partial cross-correlations $\{r_{1jA}, r_{1jD}\}$ upon which conditioning obtained $\psi_1$ (2). This results in an unconditional MAI plus noise variance where the unconditional nature is with respect to the cross-correlations. The expressions for the advanced and delayed MAI variances are identical in this case. Nevertheless, the MAI plus noise variance is still time-varying due to the term $|c_1|$ which is needed in the numerator of any LLR form and hence it is estimated, i.e. conditioned upon. This form may be referred to as SILLRC2.

Finally, averaging over $|c_1|$, an unconditional MAI plus noise variance may be obtained that is time-independent. This may also be applied to the synchronous case and referred to as simplified ILLR (SILLR). Using the fact that $E[r_{jk}^2] = 1/N$, the unconditional MAI plus noise variance for both the advanced and delayed bits may be expressed as $$n_j^2 = \sigma^2 + \frac{1}{N}\sum_{k \neq j} E_k \qquad (33)$$

Among the several simplified forms described above the SILLR is the only one where the MAI plus noise variance is not time-varying, simplifying the computations in equations (30) and (32). It is noted that the conditioning on $|c_1|$ necessary for coherent demodulation and decoding is overlooked in the SILLR technique in the interest of making $n_j^2$ time-independent.

The following equations may represent conditional variance for full PIC in the bit-asynchronous case:

$$\psi_1(2) = \sum_{j=2}^{K} \psi_{1jA}(2) + \psi_{1jD}(2) + \sigma^2$$

Variance may be represented for different techniques as follows:

ILLR-XC $$\psi_{1jA(D)}(2) = 4 X_{j1}^2 r_{1jA(D)}^2 Q\left(\frac{|c_j|}{\eta_{jA(D)}}\right)$$

where $$\eta_{jA(D)}^2 = \sum_{k \neq j} X_{kj}^2 r_{jA(D)k}^2 + \sigma^2$$

ILLR-C $$\psi_{1jA}(2) = 4\frac{N_j}{N^2} X_{j1}^2 Q\left(\frac{|c_j|}{\eta_{jA}}\right)$$

where $N_j$=the delay of user j in number of chips relative to user 1, and $$\psi_{1jD}(2) = 4\frac{(N - N_j)}{N^2} X_{j1}^2 Q\left(\frac{|c_j|}{\eta_{jD}}\right)$$

where $$\eta_{jA(D)}^2 = \frac{1}{N}\sum_{k \neq j} X_{kj}^2 + \sigma^2.$$

Simulation Results for the Second Aspect

In this section, simulation results are provided for a block fading channel. The matched filter performance is shown for reference with the label MF. The label ConvLLR refers to the conventional LLR computation described above and is based on a fixed estimate for the RMAI variance. Further, the results for the ILLR-X and the SILLR-X are also presented. The performance of the other two techniques, SILLRC and SILLRC2, should lie between the ILLR-X, which has the best performance, and the SILLR-X, which requires the least complexity. For this reason, only the results for ILLR-X and SILLR-X are presented. For all the simulation results given in this section, the parallel concatenated Turbo encoder of the UMTS standard was used with a code rate of ½. Five iterations internal to the Turbo decoder are used throughout using max*-log-MAP. A random Turbo interleaver was used of size I=1024.

In the block fading model, all the bits of a user within a block experience identical fading. The fading of different blocks is independent in time and across users. The block length is 64 code bits and perfect interleaving is applied.

Figure 13:
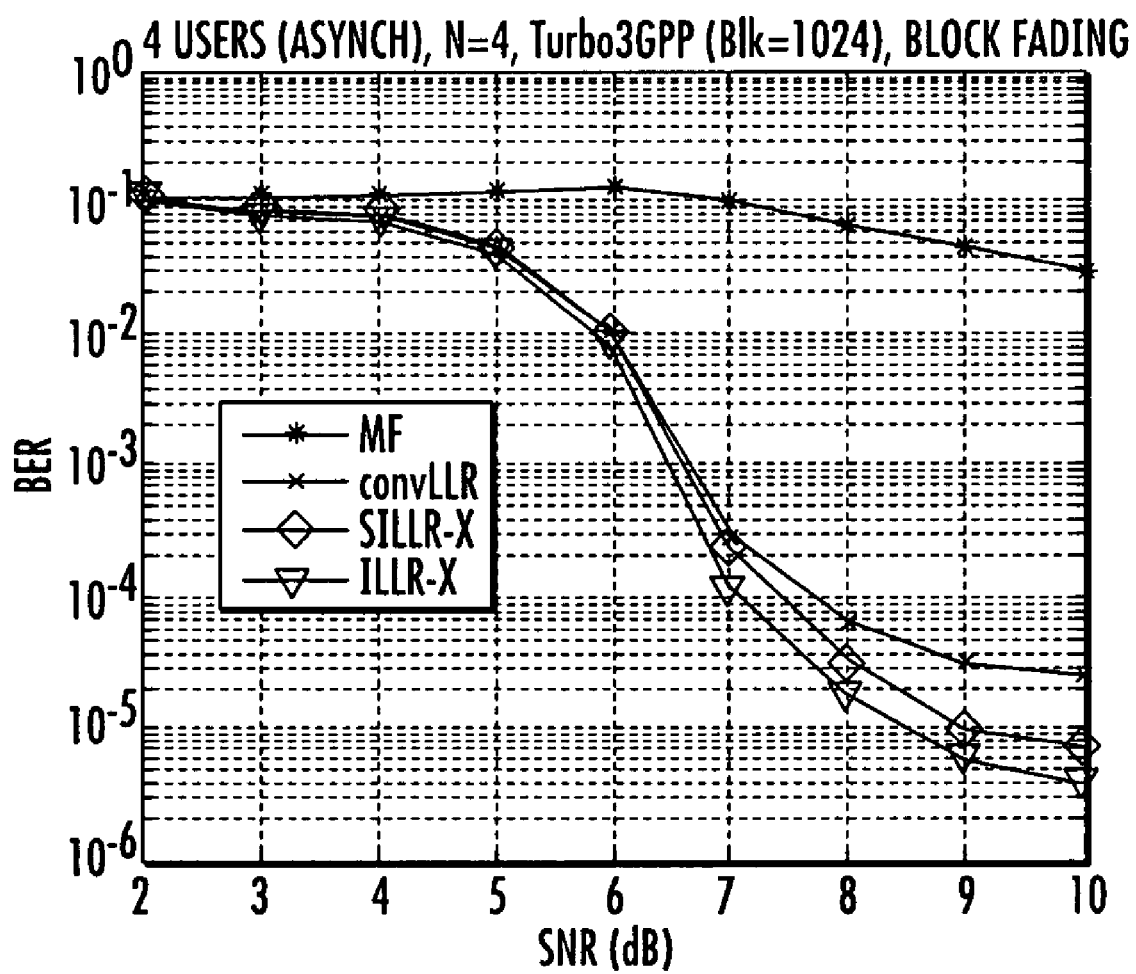
FIG. 13 is a graph showing a comparison of performance results of the improved techniques ILLRC and SILLR to fixed variance techniques conventional LLR computation and normalized LLR showing also the matched filter performance for reference.

Regarding the block fading model, FIG. 13 is a graph showing a comparison of the performance of the improved techniques ILLR-X and SILLR-X to the fixed variance techniques ConvLLR. The results are for a 4-user system with N=4. Taking user 1 as the user of interest, the other three interfering users have equal delays of 2 chips each relative to the first user.

As discussed above, the SILLR-X gives close to 0.5 dB improvement over the ConvLLR starting at an SNR of 7 dB while the ILLR-X gives about a 1 dB improvement in the same range. Due to the approximations involved in the computations of all LLRs, a correction factor, to be obtained experimentally for each SNR point, in the denominator of the LLR improves performance.

Conclusions and Discussion for the Second Aspect

An enhanced variance estimate for the RMAI after PIC for asynchronous systems were derived. Conditioning on the time-varying cross-correlations, improvements to the LLR computation of Turbo decoders were achieved and performance was improved. The gains are more significant for heavily loaded systems and appear at moderate and high SNR. It is noted that only one stage of PIC and decoding was applied. While the variance estimate of equations (30) and (32) may be difficult to obtain in subsequent PIC stages, it is the idea of using a time-varying RMAI estimate in the LLR based on the random cross-correlations that gives the performance gain. This is supported by the fact that the SILLR-X performs reasonably close to the ILLR-X. Hence, a constant term, obtained experimentally, multiplying the time-varying cross-correlations should perform well. Further, it is well-known that the performance of multiple stages is highly affected by the first stage, which is already improved. Further improvement may be achieved by computing scale factors to account for the difference between the true and estimated RMAI variances. Another additional modification based on the computation of the cross-correlations is their use as a reliability indicator for partial PIC rather than fixed partial weights. One potential simplification that could reduce the computational load is to use the sum of the magnitude of the cross-correlations. It is noted that the conditional variance estimates presented are directly applicable to single-user Viterbi decoders.

Additional Discussions, Conclusions, and Embodiments

The subject matter disclosed herein is useful for improving performance of subtractive IC receiver structures, as well as receivers with no IC, for CDMA systems with forward error correction. Single-user decoders are usually employed in multiuser receivers for their relatively low complexity. Despite various advances in multiuser detection, little or no attention has been given to improving the single-user decoder LLRs in multiuser receivers. For subtractive IC detectors, information about the interfering users is available or acquired since it is needed in the IC stages. Some of this information may be incorporated in the decoder LLRs to improve performance. For CDMA systems with long sequences, such as IS-95, several modifications, of varying complexity and performance, have been proposed to the decoder LLRs. The modifications were based on modeling the RMAI as Gaussian conditioned on the time-varying user cross-correlations and deriving an accurate estimate of the RMAI variance. Significant performance improvement was demonstrated at moderate to high SNR. It should be mentioned that the modified decoders require as estimate of the average SNR or, equivalently, the noise power except at high SNR where the noise variance $\sigma^2$ may be neglected. This information is not explicitly needed for the IC stage, but is not difficult to calculate. For Turbo decoders the noise variance is always needed.

The performance gain may be further increased based on more accurate estimates of the conditional variance of the RMAI plus noise, particularly for the low SNR region. This improved accuracy may be obtained by inclusion of scale factors (to be obtained experimentally) in the derived expressions. The metrics were proposed for two alternative receiver structures: ICUD, in which IC occurs before any decoding takes place, and PDIC where decoded decisions are used in IC. For the latter scheme, a further refinement is possible by calculating the first stage code bit error probabilities as a function of the time-varying cross-correlations. This would parallel the metric for the ICUD structure, and we would obtain a conditional (and time-varying) code bit error probability. Since this error probability would have to be estimated in real-time, however, it appears that such an approach may be impractical at the moment.

The single-user decoder LLRs may be further improved, generally speaking, by incorporating additional knowledge about the interfering users' signal parameters. This may be very attractive particularly when this information is readily available or must be acquired for the IC stages of the receiver.

The improved single-user decoder branch metrics according to embodiments of the subject matter disclosed herein may be incorporated at any point in a multiple-access communication network where multiple access signals are received. For example, it may be desirable to incorporate such branch metrics in a base station in a CDMA system. Alternatively, the improved branch metrics may be incorporated in a mobile communication handset. Using the improved single-user decoder branch metrics at any receiving location in a CDMA system is intended to be within the scope of the subject matter disclosed herein.

Figure 14:
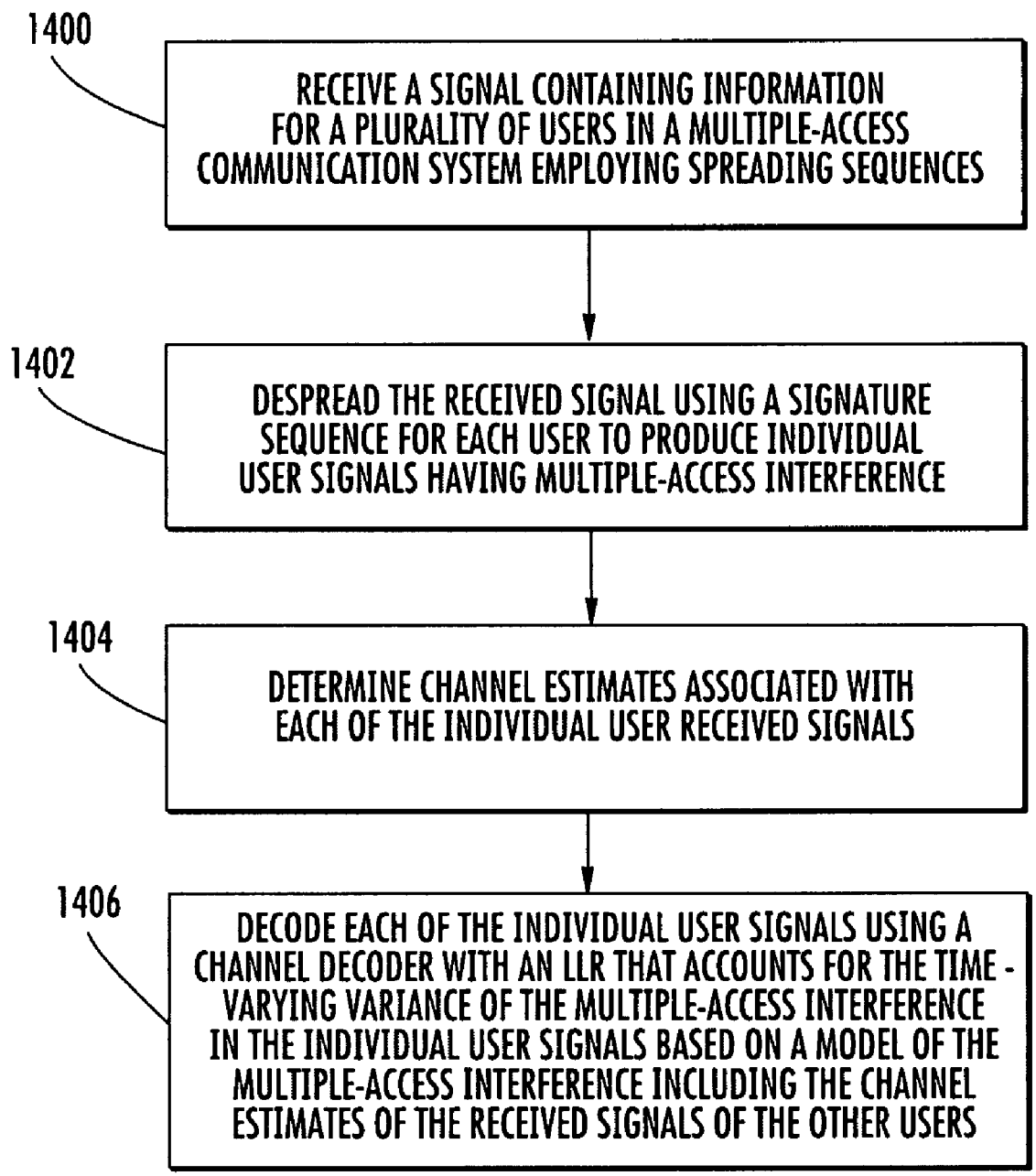
FIG. 14 is a flow chart of a process for demodulating a multiuser signal using channel decoders for a multiple-access communication system according to an embodiment of the subject matter disclosed herein.

According to one aspect, the subject matter described herein includes a method for demodulating a multiuser signal using channel decoders for a multiple-access communication system. FIG. 14 illustrates an example of a method. In FIG. 14, in block 1400, a signal containing information for a plurality of users in a multiple-access communication system employing spreading sequences is received. In block 1402, the received signal is despread using a signature sequence for each user to produce individual user signals having MAI. In block 1404, channel estimates associated with each of the individual user received signals are determined. In block 1406, each of the individual user signals are decoded using a channel decoder with a log-likelihood ratio (LLR) that accounts for the time-varying variance of the MAI in the individual user signals based on a model of the MAI including the channel estimates of the received signals of other signals. Decoding may be implemented by use of any suitable decoder. For example, decoding may be implemented by use of a Turbo decoder, a Viterbi decoder, or any other suitable decoder for the encoder used in the transmitter. Any decoder that would benefit from knowledge of the variance of the MAI and/or RMAI plus noise would benefit from the improved techniques. Interference cancellation may be applied in accordance with this aspect. Examples of any suitable type including full parallel interference cancellation (PIC), fixed partial PIC, and partial PIC (PPIC). IC may be performed in an unlimited number of ways. The exact expression for the MAI and RMAI plus noise variance, and hence the improved LLRs, would depend on the specific IC method used. Alternatively, no IC may be not be applied in the demodulation process.

Figure 15:
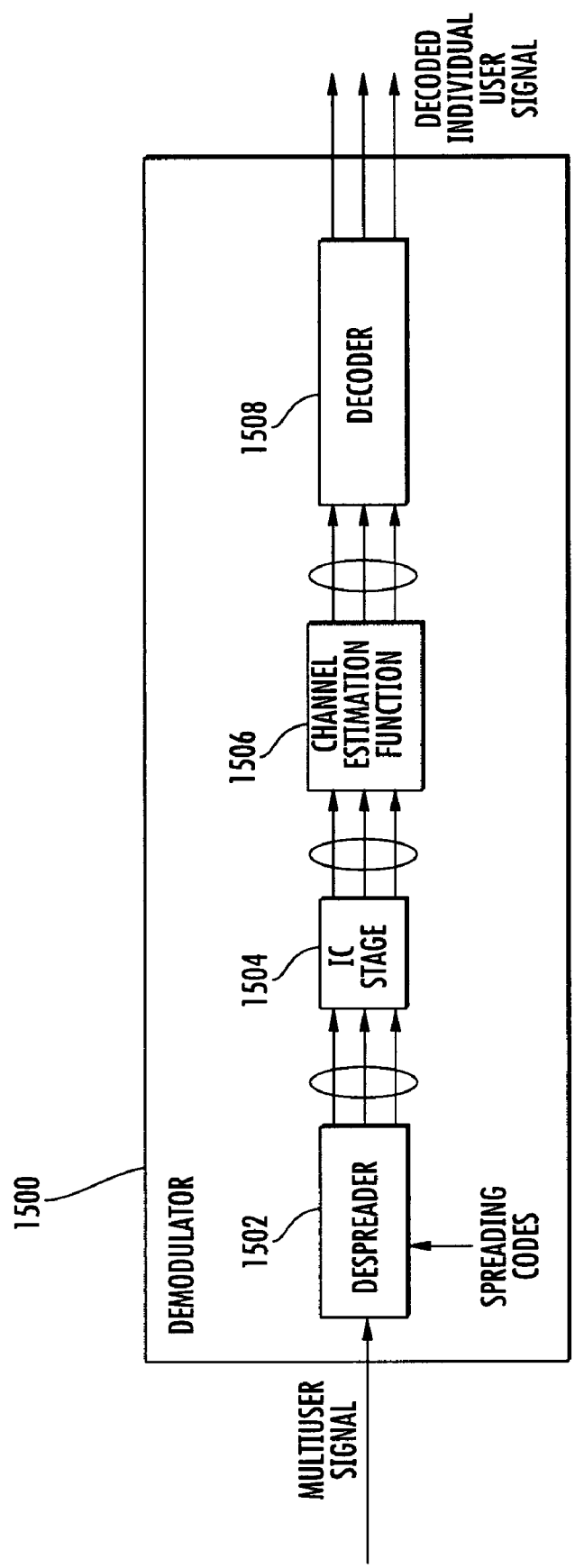
FIG. 15 is a block diagram of a demodulator for demodulating a multiuser signal using channel decoding for a multiple-access communication system according to an embodiment of the subject matter disclosed herein.

According to another aspect, the subject matter described herein includes a demodulator for demodulating a multiuser signal using channel decoding for a multiple-access communication system. FIG. 15 illustrates such a demodulator. In FIG. 15, demodulator 1500 includes a despreader 1502 configured to receive a signal containing information for a plurality of users in a multiple-access communication system employing spreading sequences and configured to despread the received signal using a signature sequence for each user to produce individual user signals having MAI. Demodulator 1500 also includes an interference cancellation (IC) stage 1504 configured to apply IC to each of the individual user signals to remove the MAI from the individual user signals and thereby produce individual user signals containing residual multiple-access interference. Further, demodulator 1500 includes a channel estimation function 1506 configured to determine channel estimates associated with each of the individual user received signals. Demodulator 1500 may also include a decoder 1508 configured to decode each of the individual user signals using a channel decoder with an LLR that accounts for the time-varying variance of the MAI in the individual user signals based on a model of the MAI including the channel estimates of the received signals of other signals. The application of interference cancellation may be of any suitable type including full parallel interference cancellation (PIC), fixed partial PIC, and partial PIC (PPIC). IC may be performed in an unlimited number of ways. The exact expression for the MAI and RMAI plus noise variance, and hence the improved LLRs, would depend on the specific IC method used. Alternatively, in one embodiment, IC is not applied in the demodulation process.

Figure 16:
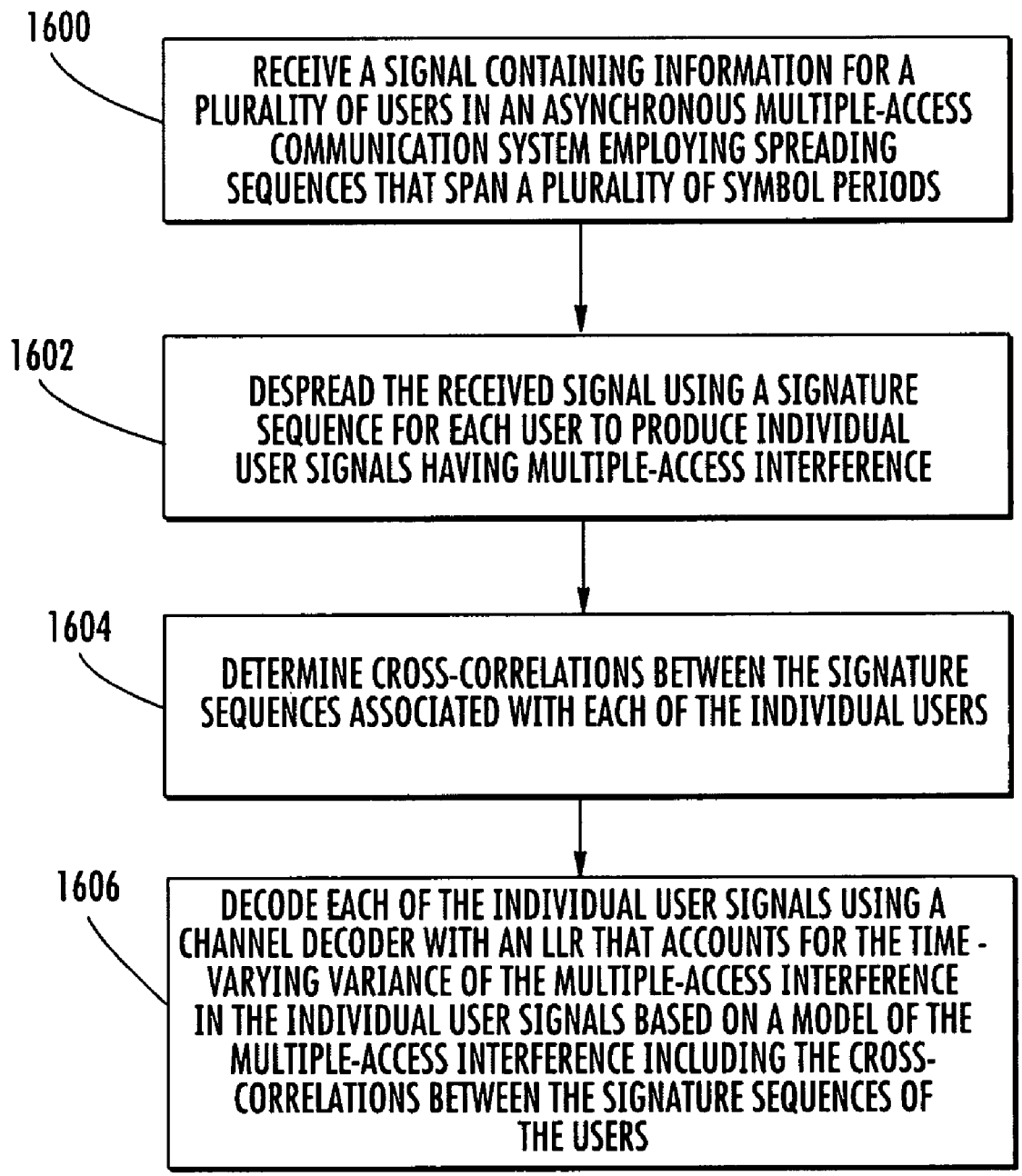
FIG. 16 is a flow chart of a process for demodulating a multiuser signal using channel decoders for asynchronous multiple-access communication system according to an embodiment of the subject matter disclosed herein.

According to another aspect, the subject matter described herein includes a method for demodulating a multiuser signal using channel decoders for asynchronous multiple-access communication system. FIG. 16 illustrates an example of a method. In FIG. 16, in block 1600, a signal containing information for a plurality of users in an asynchronous multiple-access communication system employing spreading sequences that span a plurality of symbol periods. In block 1602, the received signal is despread using a signature sequence for each user to produce individual user signals having MAI. In block 1604, cross-correlations between the signature sequences associated with each of the individual users are determined. In block 1706, each of the individual user signals are decoded using an LLR that accounts for the time-varying variance of the MAI in the individual user signals based on a model of the MAI including the cross-correlations between the signature sequences of the users.

Figure 17:
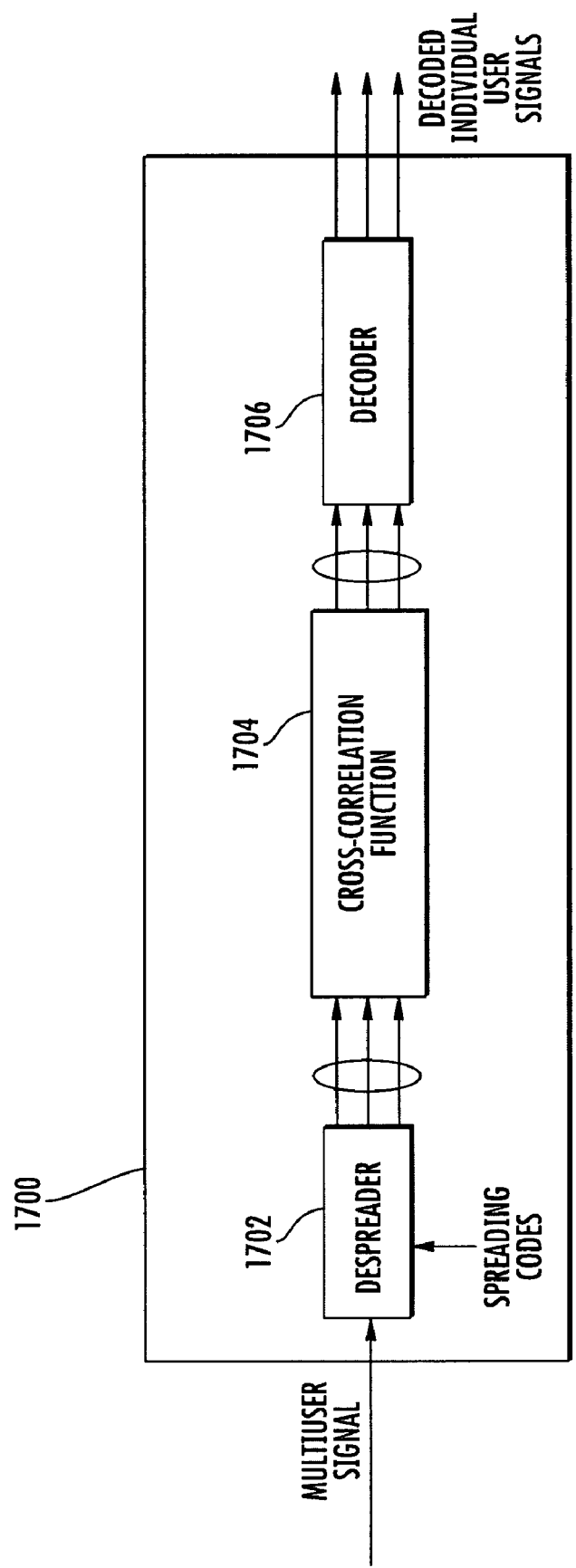
FIG. 17 is a block diagram of another example of a demodulator for demodulating a multiuser signal using channel decoders for a multiple-access communication system according to an embodiment of the subject matter disclosed herein.

FIG. 17 illustrates another example of a demodulator for demodulating a multiuser signal using channel decoders for a multiple-access communication system. In FIG. 17, demodulator 1700 includes a despreader 1702 configured to receiver a signal containing information for a plurality of users in a multiple-access communication system employing spreading sequences and configured to despread the received signal using a signature sequence for each user to produce individual user signals having MAI. Demodulator 1700 also includes a cross-correlation function 1702 configured to determine cross-correlations associated with each of the individual users. Demodulator 1700 may also include a decoder 1704 configured to decode each of the individual user signals using a channel decoder with an LLR that accounts for the time-varying variance of the MAI in the individual user signals based on a model of the MAI including the cross-correlations of the received signals of other users.

Any suitable combination of the entirety or portions of the above described embodiments and aspects may be combined for demodulating a multiuser signal. Further, any such combination may be included in any suitable process or component associated with a multiple-access communication system.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for demodulating a multiuser signal using channel decoders for a multiple-access communication system, the method comprising:
    receiving a signal containing information for a plurality of users in a multiple-access communication system employing spreading sequences;
    despreading the received signal using a signature sequence for each user to produce individual user signals having multiple-access interference (MAI);
    determining channel estimates associated with each of the individual user signals; and
    decoding each of the individual user signals using a channel decoder that computes a log-likelihood ratio (LLR) based on an equation for the time-varying variance of the MAI in the individual user signals in which the channel estimates of the received signals of other users are represented by fading coefficients due to the MAI from the received signals of the other users experienced by the individual user signal being decoded.

2. The method of claim 1 wherein receiving a signal containing information for a plurality of users comprises receiving the signal containing information for the plurality of users in an asynchronous multiple-access communication system.

3. The method of claim 1 wherein receiving a signal containing information for a plurality of users comprises receiving the signal containing information for the plurality of users in a synchronous multiple-access communication system.

4. The method of claim 1 wherein decoding each of the individual user signals using a channel decoder comprises decoding with a decoder that can benefit from knowledge of the variance of the MAI and RMAI plus noise.

5. The method of claim 1 wherein the decoder comprises a single user matched filter used without any prior or subsequent parallel interference cancellation.

6. The method of claim 1 wherein decoding each of the individual user signals comprises modeling the MAI plus noise (MAIN) as a Gaussian random variable with time-varying variance, and the method comprising computing an approximation of the time-varying variance of the MAIN.

7. The method of claim 1 comprising applying interference cancellation (IC) to each of the individual user signals to remove the MAI from the individual user signals and thereby producing individual user signals containing residual multiple-access interference (RMAI).

8. The method of claim 7 wherein decoding each of the individual user signals comprises modeling the RMAI plus Noise (RMAIN) as a Gaussian random variable with time-varying variance and computing an approximation of the time-varying variance of the RMAIN.

9. The method of claim 8 comprising computing an approximation of the time-varying variance of the RMAIN conditioned on the channel estimates of the individual user signals of the other users.

10. The method of claim 8 wherein modeling the RMAIN comprises modeling the RMAIN based on a type of the applied IC.

11. The method of claim 10 wherein modeling the RMAIN based on a type of the applied IC comprises modeling the RMAIN based on one of: the channel estimates and cross-correlations of the signature sequences.

12. The method of claim 1 comprising determining cross-correlations between the signature sequences associated with each of the individual users, and
    wherein decoding each of the individual user signals comprises using the channel decoder to account for the time-varying variance of the MAI in the individual user signals based on the model of the MAI including the cross-correlations between the signature sequences associated with each of the users.

13. The method of claim 12 wherein computing the time-varying variance of the RMAIN comprises computing an approximation of the time-varying variance conditioned on the channel estimates and cross-correlations associated with all of the users.

14. The method of claim 1 comprising deriving partial cancellation factors based on the LLR.

15. A method for demodulating a multiuser signal using channel decoders for an asynchronous multiple-access communication system, the method comprising:
    receiving a signal containing information for a plurality of users in an asynchronous multiple-access communication system employing spreading sequences that span a plurality of symbol periods;
    despreading the received signal using a signature sequence for each user to produce individual user signals having multiple-access interference (MAI);
    determining cross-correlations between the signature sequences associated with each of the individual users; and decoding each of the individual user signals using a channel decoder that computes a log-likelihood ratio (LLR) based on an equation for the time-varying variance of the MAI in the individual user signals in which the cross-correlations between the signature sequences of the users are multiplied by fading coefficients due to the MAI from the individual user signals of other users experienced by the individual user signal being decoded.

16. The method of claim 15 comprising applying interference cancellation (IC) to each of the individual user received signals to remove the MAI from the individual user signals and thereby producing individual user signals containing residual multiple-access interference (RMAI).

17. The method of claim 16 wherein decoding each of the individual user signals comprises modeling the RMAI as a Gaussian random variable with time-varying variance and computing an approximation of the time-varying variance of the RMAIN.

18. The method of claim 17 wherein computing the time-varying variance of the RMAIN comprises computing an approximation of the time-varying variance conditioned on the cross-correlations of the other users.

19. The method of claim 15 comprising deriving partial cancellation factors based on the LLR.

20. A demodulator for demodulating a multiuser signal using channel decoding for a multiple-access communication system, the demodulator comprising:
    a despreader configured to receive a signal containing information for a plurality of users in a multiple-access communication system employing spreading sequences and configured to despread the received signal using a signature sequence for each user to produce individual user signals having multiple-access interference (MAI);
    a channel estimation function configured to determine channel estimates associated with each of the individual user signals; and
    a decoder configured to decode each of the individual user signals using a channel decoder that computes a log-likelihood ratio (LLR) based on an equation for the time-varying variance of the MAI in the individual user signals in which the channel estimates of the received signals of other users are represented by fading coefficients due to the MAI from the individual user signals of the other users experienced by the individual user signal being decoded.

21. The demodulator of claim 20 comprising an interference cancellation stage configured to apply IC to each of the individual user signals to remove the MAI from the individual user signals and thereby produce individual user signals containing residual multiple-access interference (RMAI), and
    wherein the decoder is configured to model the RMAIN as a Gaussian random variable with time-varying variance and configured to compute an approximation of the time-varying variance of the RMAIN.

22. The demodulator of claim 20 comprising a cross-correlation function configured to determine cross-correlations between the signature sequences associated with each of the individual users, and
    wherein the decoder is configured to use the channel estimates to account for the time-varying variance of the RMAIN in the individual user signals based on the model of the RMAIN including the cross-correlations associated with each of the individual users.

23. A demodulator for demodulating a multiuser signal using channel decoders for a multiple-access communication system, the demodulator comprising:
    a despreader configured to receive a signal containing information for a plurality of users in a multiple-access communication system employing spreading sequences and configured to despread the received signal using a signature sequence for each user to produce individual user signals having multiple-access interference (MAI);
    a cross-correlation function configured to determine cross-correlations associated with each of the individual users; and
    a decoder configured to decode each of the individual user signals using a channel decoder that computes a log-likelihood ratio (LLR) based on an equation for the time-varying variance of the MAI in the individual user signals in which the cross-correlations of the individual user signals of other users are multiplied by fading coefficients due to the MAI from the individual user signals of the other users experienced by the individual user signal being decoded.

24. The demodulator of claim 23 wherein the decoder is configured to decode each of the individual user signals using a Turbo decoder, and wherein the multiple-access communication system is Turbo encoded.

25. The demodulator of claim 23 wherein the decoder is configured to model the RMAI plus noise (RMAIN) as a Gaussian random variable with time-varying variance and configured to compute an approximation of the time-varying variance of the RMAIN.

* * * * *